(12) United States Patent
Shimada et al.

(10) Patent No.: US 8,596,924 B2
(45) Date of Patent: Dec. 3, 2013

(54) METHOD FOR STRENGTHENING A GROUND

(75) Inventors: Shunsuke Shimada, Tokyo (JP); Miki Oba, Tokyo (JP)

(73) Assignee: Kyokado Engineering Co., Ltd., Tokyo (JP)

( * ) Notice: Subject to any disclaimer, the term of this patent is extended or adjusted under 35 U.S.C. 154(b) by 537 days.

(21) Appl. No.: 11/883,760

(22) PCT Filed: Jun. 1, 2006

(86) PCT No.: PCT/JP2006/311475
§ 371 (c)(1),
(2), (4) Date: Aug. 21, 2009

(87) PCT Pub. No.: WO2006/129884
PCT Pub. Date: Dec. 7, 2006

(65) Prior Publication Data
US 2009/0304457 A1    Dec. 10, 2009

(30) Foreign Application Priority Data
Jun. 2, 2005    (JP) .................................. 2005-162300

(51) Int. Cl.
*C09K 17/00*    (2006.01)

(52) U.S. Cl.
USPC ............ 405/269; 405/233; 405/266; 405/267

(58) Field of Classification Search
USPC ......... 405/233, 236, 237, 238, 241, 242, 266, 405/267, 269; 106/600, 900
See application file for complete search history.

(56) References Cited

U.S. PATENT DOCUMENTS

| | | | | |
|---|---|---|---|---|
| 5,141,365 A | * | 8/1992 | Smart | 405/267 |
| 5,401,312 A | * | 3/1995 | Hanst | 106/706 |
| 5,836,390 A | * | 11/1998 | Apps et al. | 166/281 |
| 5,951,751 A | * | 9/1999 | Williams et al. | 106/706 |
| 2004/0247397 A1 | * | 12/2004 | Fox | 405/248 |
| 2005/0166802 A1 | * | 8/2005 | Matula et al. | 106/803 |

FOREIGN PATENT DOCUMENTS

| | | |
|---|---|---|
| JP | 6-108449 | 4/1994 |
| JP | 11-124574 | 5/1999 |
| JP | 11-193382 | 7/1999 |
| JP | 2000-87035 | 3/2000 |
| JP | 2001-98271 | 4/2001 |
| JP | 2002-88752 | 3/2002 |
| JP | 2002-294686 | 10/2002 |
| JP | 2003-105745 | 4/2003 |
| JP | 2006-56909 | 3/2006 |

OTHER PUBLICATIONS

Eric Koehler, David Fowler; Summary of Concrete Workability Test Methods; Aug. 2003; pp. 6-8.*

* cited by examiner

*Primary Examiner* — Benjamin Fiorello
(74) *Attorney, Agent, or Firm* — Banner & Witcoff, Ltd.

(57) ABSTRACT

A plastic gel grouting material, which comprises a silica type non-hardening powdery material and water or a silica type non-hardening powdery material, a calcium type hardening developing material and water as active ingredients, is statically pressure-injected into a soft, loose or weak ground to thereby form masses derived from the grouting material per se in the ground, and concurrently therewith, to compact the surrounding earth and sand, thereby increasing density of the ground.

A plastic gel grouting material is provided which loses its flowability with time or by dewatering to form masses derived from the grouting material per se in a ground and which comprises a silica type non-hardening powdery material and water or a silica type non-hardening powdery material, a calcium type hardening developing material and water as active ingredients.

1 Claim, 13 Drawing Sheets

Fig 1
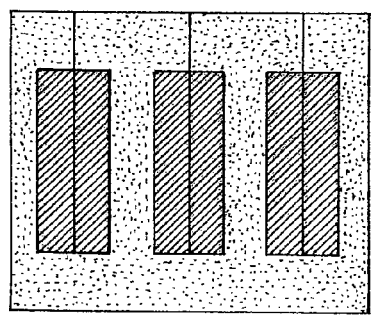
(A)
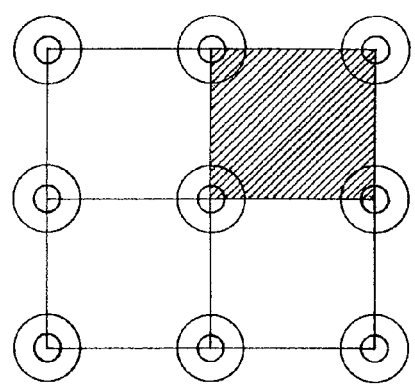
(B)
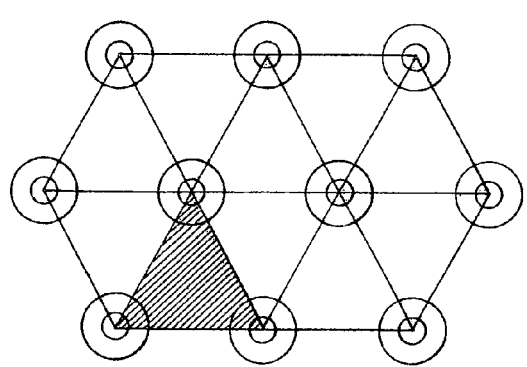
(C)

Fig 2
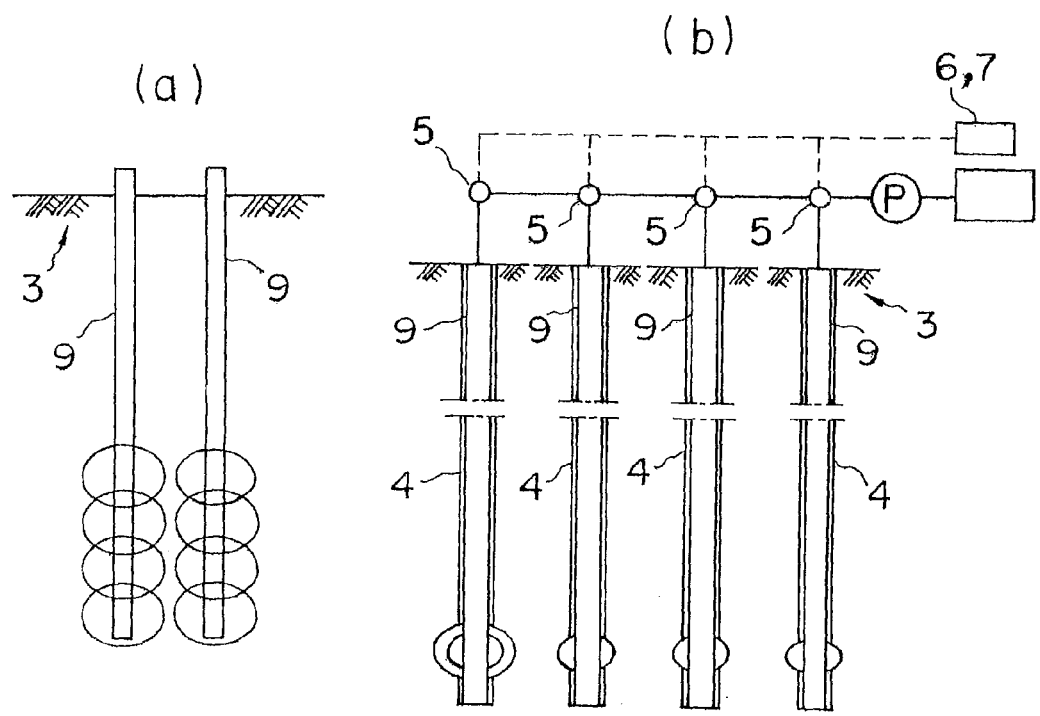
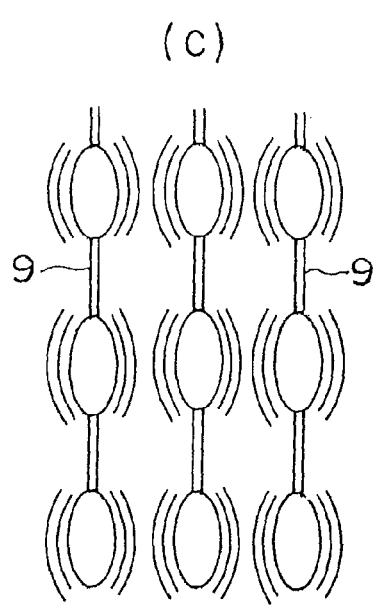

Fig 4
(a)
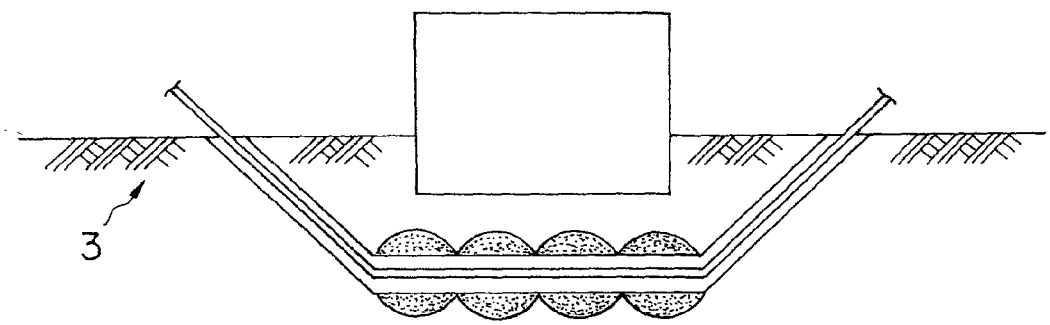
(b)
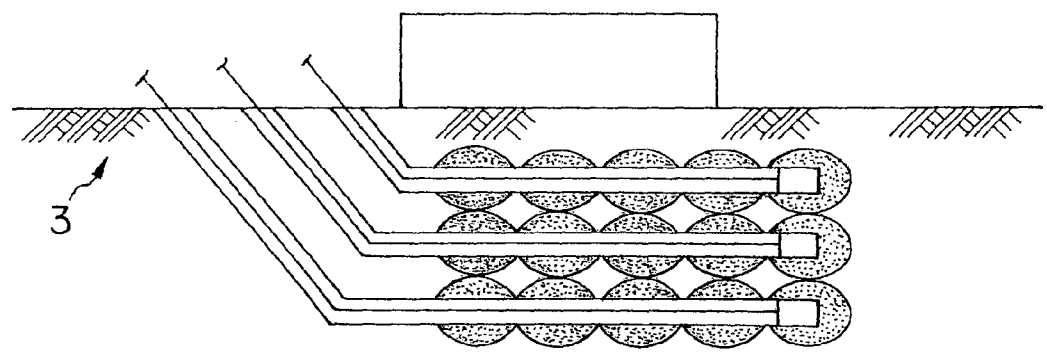

Fig 5
(a)
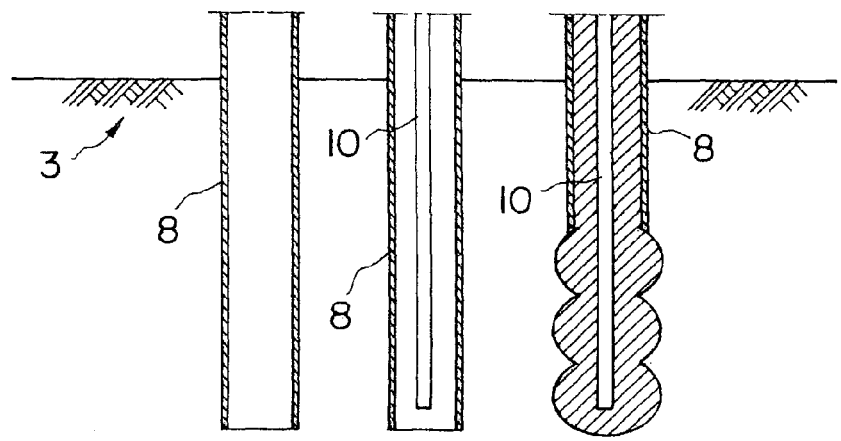
(b)
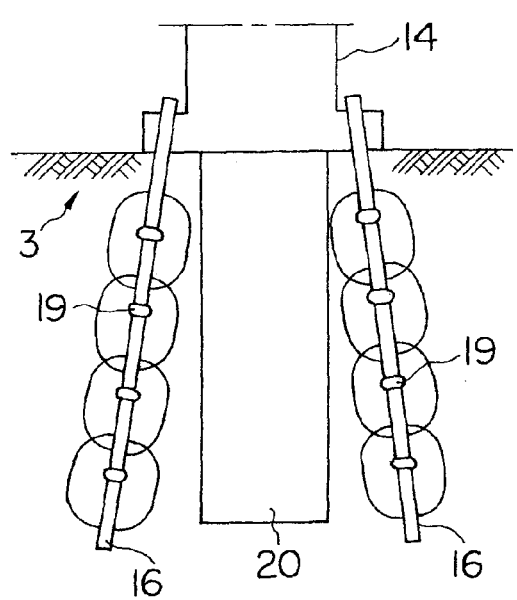
(c)
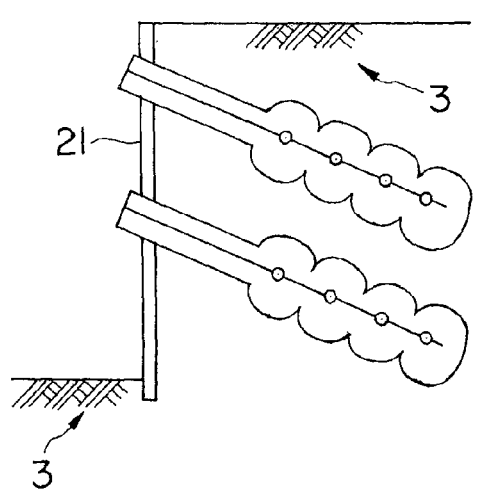

Fig 8

| Monitoring screen | | | Time 20min |
|---|---|---|---|
| Cum. flow vol. 01~05 | Max. pressure 01~05 | Cum. flow vol. 06~10 | Max. pressure 06~10 |
| 01–cumulative 123.4 L | 01–max.pressure 1.23 MPa | 06–cumulative 123.4 L | 06–max. pressure 1.23 MPa |
| 02–cumuative 123.4 L | 02–max.pressure 1.23 MPa | 07–cumulative 123.4 L | 07–max. pressure 1.23 MPa |
| 03–cumulative 123.4 L | 03–max.pressure 1.23 MPa | 08–cumulative 123.4 L | 08–max. pressure 1.23 MPa |
| 04–cumulative 123.4 L | 04–max.pressure 1.23 MPa | 09–cumulative 123.4 L | 09–max. pressure 1.23 MPa |
| 05–cumulative 123.4 L | 05–max.pressure 1.23 MPa | 10–cumulative 123.4 L | 10–max. pressure 1.23 MPa |
| 01~05 flow rate/pressure | | 06~10 flow rate/pressure | |
|  | 01 flow rate 10.5 L |  | 06 flow rate 10.5 L |
|  | 01 pressure 1.00 MPa |  | 06 pressure 1.00 MPa |
|  | 02 flow rate 10.5 L |  | 07 flow rate 10.5 L |
|  | 02 pressure 1.00 MPa |  | 07 pressure 1.00 MPa |
|  | 03 flow rate 10.5 L |  | 08 flow rate 10.5 L |
|  | 03 pressure 1.00 MPa |  | 08 pressure 1.00 MPa |
|  | 04 flow rate 10.5 L |  | 09 flow rate 10.5 L |
|  | 04 pressure 1.00 MPa |  | 09 pressure 1.00 MPa |
|  | 05 flow rate 10.5 L |  | 10 flow rate 10.5 L |
|  | 05 pressure 1.00 MPa |  | 10 pressure 1.00 MPa |

METHOD FOR STRENGTHENING A GROUND

TECHNICAL FIELD

The present invention relates to a plastic gel grouting material and a method for strengthening a ground which are intended to strengthen a ground by injecting a plastic gel grouting material into the ground to push soil particles outward while forming masses derived from the plastic gel with a lapse of time or by dewatering under pressure, thereby strengthening the ground by the formation of the masses derived from the plastic gel grouting material itself in the ground.

BACKGROUND ART

As a method for strengthening ground by injecting a consolidating material into a ground to push earth and sand outward, and consequently, give rise to density increase, a method has heretofore been known which comprises injecting a non-fluid grouting material (mortar) with low slump or no substantial slump into a ground to develop solidified masses in the ground, thereby consolidating the ground [see Japanese Unexamined Patent Publication No. 108449/1994 (Heisei 6)].

However, since the above-mentioned method requires a large-sized apparatus, the method is unsuitable for reinforcement of a foundation of an architectural structure in an area crowded with architectural structures in which liquefaction prevention work or the like is effected or a place just below an architectural structure.

On the other hand, there has been a void filling method which comprises separately delivering a flowable mortar containing cement as a main ingredient and a plasticizer such as a water glass, an aluminum salt or the like to a place near an injection inlet, combining and mixing these at the place to form a plastic grout having such low flowability that slump is 3 cm or less, and injecting the plastic grout into a ground.

However, if such a plastic grout is pressure-injected into a soft ground, weak ground, poor ground, loose ground or the like, fracture grouting is likely to occur to result in escape of the grout beyond an intended area of the ground in a vein-like pattern. Accordingly, it is difficult to effect ground improvement by the method.

Further, a conventional cement-based mortar grouting fluid is in a slurry form and has flowability and solidifies by hydration reaction. When such a fluid mortar is injected into a ground, it splits the ground while being injected and is likely to spread away, and considerable bleeding is likely to occur to cause phase separation and precipitation of the material in the ground and the precipitate solidifies in a vein-like pattern.

For reducing bleeding, it meets the purpose to increase cement content. However, if cement content is increased, there is a problem that hardening of the cement occurs earlier and thus a large area cannot be grouted, or that the cement splits the ground and spreads away. Further, a method has been proposed which uses an aluminum salt, a water glass or the like as a plasticizer in a fluid cement-based mortar. Such a plastic grout is suitable for hollow grouting. However, when it is injected into a ground, it hardens rapidly in the ground due to its high viscosity to allow no further injection or it splits the ground and is likely to escape.

Moreover, a method for strengthening a ground has been proposed which comprises separately pumping a cement-based suspension and a plasticizer, combining them just before injection pipes to form a plastic grout with slump of less than 5 cm, for example about 3 cm, and injecting the plastic grout into a ground to compress the surrounding soil particles.

However, slump of less than 5 cm approximately corresponds to about 10 cm in terms of flow although this somewhat depends on constituent ingredients of the grout. In this case, the gelled material is in such a state that it makes no substantial movement even when vibration caused by drop is applied thereto. If such a plastic grout with low slump is injected into a ground, separation occurs between water phase (water) and solid phase (powdery matter) in the ground, and the grout further loses flowability by dewatering to rapidly harden. Accordingly, no substantial time period in which the grout retains plasticity can be obtained. In consequence, injection pressure increases. Due to this, no further injection is allowed, or the grout splits the ground in a vein-like pattern and escapes in unspecified directions. Accordingly, no substantial ground strengthening effect is obtained.

DISCLOSURE OF INVENTION

It is, therefore, an object of the present invention to provide a grouting material which does not permeate between soil particles when injected into a ground and maintains its flowability in the ground to form a mass at a predetermined position without escaping beyond a predetermined area, and which allows the masse derived from the grout per se to grow to a possible maximum size and pushes the surrounding soil particles during a period until the grout solidifies to increase density of the surrounding earth and sand, and which is capable of satisfying both the hardly compatible features and solving the problems inherent in the above-described known techniques; and a ground strengthening method using such a grouting material.

To solve the above-described problems, according to the plastic gel grouting material of the present invention, the grouting material is characterized in that it is a plastic gel grouting material which is pressure-injected through injection pipes placed in a ground and loses flowability with time or by dewatering to form masses and which comprises the following ingredients (1) and (3), or (1), (2) and (3) as active ingredients:

(1) silica type non-hardening powdery material (F ingredient),
(2) calcium type powdery hardening developing material (C ingredient),
(3) water (W ingredient).

Further, to solve the above-described problems, according to the ground strengthening method of the present invention, the method is characterized in that a plurality of injection holes are provided in a ground; and a plastic gel grouting material is pressure-injected into the ground through the injection holes to push soil particles of the ground outward while forming non-fluid masses in the ground, thereby increasing density of the ground surrounding the plurality of injection holes while forming the plurality of masses in the ground to effect strengthening the ground, and that the plastic gel grouting material comprises the following ingredients (1) and (3), or (1), (2) and (3) as active ingredients:

(1) silica type non-hardening powdery material (F ingredient),
(2) calcium type powdery hardening developing material (C ingredient),
(3) water (W ingredient), As described above, the present invention uses a suspension grout containing a non-hardening silica type powdery material, or further containing a calcium type hardening developing material, and kind and combination of the powdery materials are selected and the materials are blended in specific proportions. Accordingly, a desired grouting material which exhibits purposive flow characteristics and solidification characteristics is pressure-injected into a ground to form solidified masses in the ground, thereby outward pushing soil particles between injection holes to effect ground strengthening.

BRIEF DESCRIPTION OF DRAWINGS

FIG. 1 is schematic views showing models of ground strengthening by injection of a plastic grout; in which FIG. 1(a) is a sectional skeleton view showing arrangement of solidified masses derived from the plastic grout in a subject area of improvement, and FIGS. 1(b) and (c) are plan views of arrangements of plastic grout injection. FIG. 1(b) is a representation of a square arrangement, and FIG. 1(c) is a representation of a triangular arrangement.

FIG. 2(a) is a sectional view showing a manner of injection in which rod injection pipes for a plastic gel that are placed in bores adjacent to each other formed in a ground of a predetermined area are pulled up from bottom to top. FIG. 2(b) is a sectional view showing an example of a manner of plastic gel injection from inner injection pipes disposed in outer injection pipes adjacently placed in a ground of a predetermined area, in which a plastic gel is injected in an interval mode from a single pump while switching valves 5. FIG. 2(c) is a sectional view showing reinforcement in which solidified masses are formed at intervals at predetermined positions of injection pipes having tensile strengths to utilize the tensile strengths of the injection pipes in increasing ground density by means of the solidified masses.

FIGS. 4(a) and (b) are basic schematic views in section showing grout injection for antiseismic reinforcement of a ground just under a structure.

FIG. 5(a) is a schematic view showing implantation of a plastic gel by pulling up a casing which is placed in a bore and in which a reinforcing bar is inserted, wherein the plastic gel does not spread away and thus compacts the surrounding ground to form a grout pile having high strength. FIG. 5(b) is a sectional view showing strengthening of a ground of pile foundation by means of a plastic grout. FIG. 5(c) is a sectional view showing formation of anchors by injection of a plastic grout in an earth-retaining wall.

FIG. 8 is an example of indication picture of accumulated flow volumes, maximum pressures, flow rates and pressures with respect to 10 fluid delivery systems, which is displayed on an injection monitoring panel using the central management unit.

NOTE ON REFERENCE NUMBERS

Figure 3:
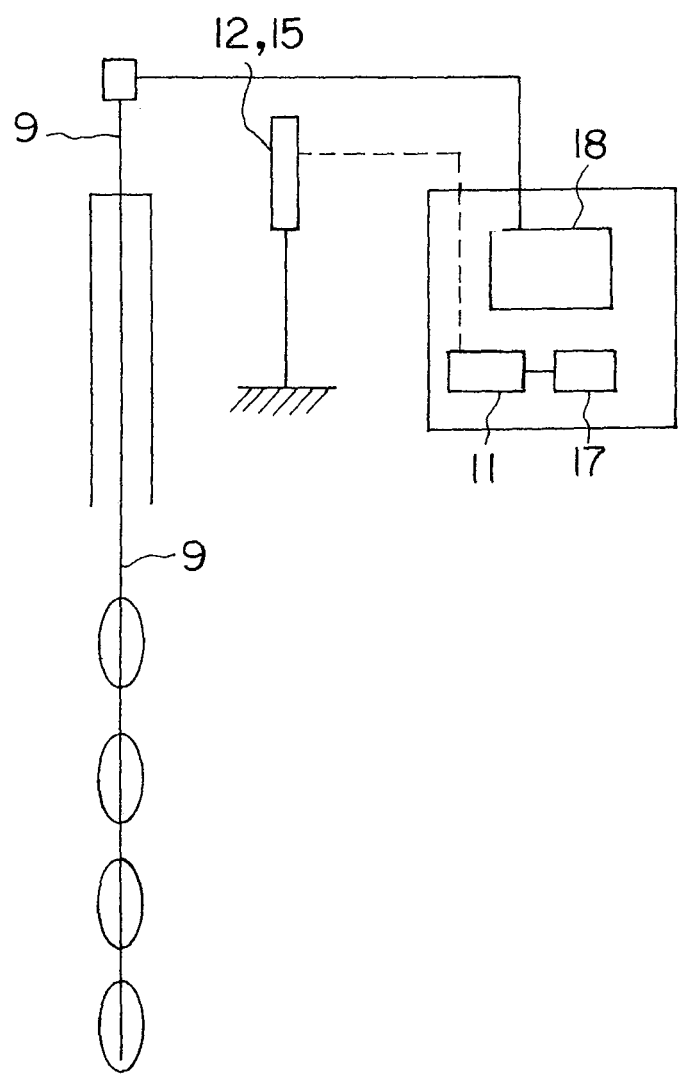
FIG. 3 is a schematic view showing a manner of measurement of displacement in ground improving operation.

3: ground
4: bore
5: valve
6: controller
7: computer
8: casing
9: injection pipe
10: reinforcing bar

BEST MODE FOR CARRYING OUT THE INVENTION

Features of the present invention are as follows.

(1) The silica type non-hardening powdery material reacts with a small amount of a Ca composition such as cement, lime or the like, and adsorbs Ca on the surface thereof at an initial stage to initiate electrochemical reaction, and serves as a binder to give rise to pseudo-reduction of flowability, and when the water-powdery matter ratio is decreased due to dewatering, a plastic gel is formed, and the plastic gel solidifies via a non-plastic gelled state. Such phenomenon is accelerated in the ground by dewatering, and if the thus formed mass has a strength higher than the surrounding ground, sufficient effect of the present invention is obtained. Further, even in a case where the hardening developing material is not added, by specifying flow characteristics of the grout in terms of flow or slump or specifying water content in terms of the water-powdery matter ratio, a mass can be formed in a ground without penetrating between soil particles or spreading in a vein-like pattern, and the mass can be expanded by continuing injection. The present inventor has found that so long as the dewatered mass keeps a strength equivalent to or higher than that of the surrounding compressed ground, the mass effectively acts to strengthen the ground.

(2) Table flow and slump indicate flowability of a grout comprising a silica type powdery material or comprising a silica type powdery material and an additional hardening developing material. The table flow is in a range of 15 cm to 25 cm, the slump is in a range of 15 cm to 28 cm, and cylinder flow is in a range of about 10 cm to about 26 cm. The grout turns into a plastic gel when the flow is about 20 cm, the slump is about 21 cm or the cylinder flow is about 15 cm, and the flow and the slump decrease as the water-powdery matter ratio decreases with time or by dewatering.

In the powdery matter comprising the silica type non-self-hardening powdery material and the calcium type hardening developing powdery material, by adjusting the ratio of water to powdery matter (water-powdery matter ratio) and ratio of the hardening developing material to the total powdery matter, it is possible to adjust plastic flow characteristics of the above-mentioned grouting material in the ground and expansion of the plastic gelled material in the ground. Further, it is possible to adjust gelation time in which the grouting material turns into the plastic gel and plastic gel state retaining time by using an additive such as an accelerator or a retardant, a fluidizer, a deflocculant, a foaming agent or the like, thereby adjusting workability and a size of the plastic gel. If the water-powdery matter ratio is too low or the ratio of the hardening developing material to the powdery matter (hardening developing material-powdery matter ratio) is too high, expansion of the mass of gel is inhibited in the ground by dewatering. Accordingly, the ratios are important.

In particular, if the hardening developing material-powdery matter ratio (simply, hardening developing material ratio) is too high, the grouting material rapidly hardens to too high a strength in the ground by dewatering, thereby, not only to prevent expansion of the gel but also to give rise to such a condition that a massive concrete body developed relative to the surrounding soil, leading to impairment of integrity of the ground as a whole in an intended area. Accordingly, intense stress is caused locally at a time of an earthquake to give rise to destruction, thereby resulting in deterioration of earthquake resistance of the treated ground.

Further, the fluid grout comprising the silica type powdery material for forming masses in ground by dewatering may contain not only the above-described artificial powdery material but also excavated earth and sand, silica sand or the like as an material and further additional clay, a viscosity improver, a water retention material or the like to form fluidized soil so adjusted as to have predetermined flow characteristics, i.e., predetermined flow and/or slump and water-powdery matter ratio, and the thus adjusted grout turns into a plastic gel when the table flow becomes 20 cm or less by dewatering and can be injected in ground without penetrating between soil particles or splitting the ground to spread away, thereby increasing density of the surrounding ground. By virtue of this, intended ground strengthening is attained. Of course, when the hardening developing material is added as an ingredient, strength of the ground is further increased.

(3) In the grouting material, its flowability changes with time in the course of the fluid delivery and in the course of the pressure-injection into ground. By effectively utilizing the change in the flow characteristics, a solidified mass can be formed in the ground. On the other hand, however, this renders formulation adjustment and injection control of the grout difficult. Accordingly, not only determination of blending proportions but also formulation controlling system and pressure-injection controlling system are important.

(4) Suitable workability for mixing and pressure-delivery of the grouting material, and pressure-injection of the grouting material into ground is such that table flow is 12 cm or more, preferably 15 cm or more, and 30 cm or less, slump is 5 cm or more, preferably 10 cm or more, and 28 cm or less, and cylinder flow is more than 8 cm, preferably about 10 cm or more, and 26 cm or less.

Determination of the water-powdery matter ratio on which slump and flow are dependent has great influences on workability and formation and expansion of masses in ground. Accordingly, it is important for forming and expanding masses of plastic gel in the ground that the flowability which momently changes with time is correctly judged and the water-powdery matter ratio and the hardening developing material-powdery matter ratio are controlled based on the flow to quickly adjust the formulation and the water-powdery matter ratio.

(5) When an additive is added, gelation time in which the grouting material turns into a plastic gel can be adjusted according to an amount of the additive. By adding a water glass or aluminum sulfate as an accelerator, it is possible to reduce flow or to shorten the gelation time, and further, to reduce slump from about 20 cm to 10 cm or less. Further, a plastic gel is formed as dewatering proceeds in a ground, and pressure-injection of the grouting material is continued in such a condition that a period of time in which the gel retains its plastic state is prolonged to thereby grow the plastic gel. It is consequently possible that large gelled masses are formed in the ground, and the gelled masses turn into solidified masses via non-plastic gel state.

In this case, by preparing a mixture of the silica type powdery material and calcium type hardening developing material as Fluid A and a fluidal silica such as water glass or a fluidal aluminum salt as Fluid B, and causing these fluids to interflow, a plastic grout with low flow or low slump can be injected.

However, in a case of hollow grouting, it is possible to inject a plastic grout with low flow or low slump, but in a case of grouting into ground, such a grout rapidly losses its flowability due to dewatering which occurs in the ground, and it is thus difficult to compress the surrounding ground by expansion of masses of gel. Accordingly, in the injection after the interflowing, the joined fluid should have table flow of 12 cm or more, slump of more than 5 cm, and cylinder flow of more than 8 cm.

(6) As an aggregate, in situ-obtained soil such as clay, earth and sand, or the like, or silica sand may be added. The aggregate not only serves as a bulking filler but also serves to adjust strength of a solidified mass and flowability. In general, a larger proportion of the aggregate in the powdery matter results in lower strength, and a larger grain size of the aggregate results in lower flowability.

Clay such as bentonite, clay or fine particulate matter such as silt, loam or the like in on site-obtained soil, a polymeric material, a viscosity improver, and the like are excellent as a water retention material or a viscosity improver. These retard dewatering of the grouting material injected in the ground and act as a binder to impart pseudo-cohesiveness to the fluid, thereby serving to form and expand a plastic gel without causing spreading away of the grouting material.

(7) Addition of an aluminum salt such as aluminum sulfate or a water glass (In the present invention, an acid water glass obtained by mixing a water glass with an acid is deemed to be a water glass.) give rise to reduction of slump, reduction of flow, and increase of viscosity. For forming masses of plastic gel in ground and growing the masses of gel without vein-like fractures of the grouting material in the ground, method for selecting and utilizing ranges of the hardening developing material-powdery matter ratio, the water-powdery matter ratio, aluminum content, flow value and slump value, and silica content and the like are important.

(8) Since a cement type suspension grout as such has high viscosity, if it is rendered plastic, there is such a problem that fluid injection resistance in injection from injection ports of injection pipes which open in the ground and fluid delivery resistance in fluid delivery pipes in fluid delivery to the injection ports are extremely high, and thus the plastic grout is likely to block the delivery pipes or a pump. Then, if a dilute formulation is used in order to facilitate fluid delivery the grout is likely to spread in the ground in a vein-like pattern. Accordingly, in conventional techniques, a method has been proposed which comprises, as in backspace grouting, causing a cement type suspension having high flowability and a plasticizer to interflow at a time point before entrance into injection pipes to instantaneously render the mixture plastic to a plasticity of 5 cm in terms of slump, followed by pressure-injection into the ground. However, since the cement type plastic grout which has been rendered plastic prior to the entrance into the injection pipes immediately hardens to have high strength in the ground by dewatering, it is difficult for masses of gel to grow to massive sizes, or high injection pressure is required and thus no further injection is allowed, or the grout sprits the ground and escapes.

The present inventors have focused attention on the fact that injection in ground improvement which comprises pressure-injecting a grout into a ground to form large masses of gel and to thereby compress the surrounding earth and sand is fundamentally different from injection of a plastic grout for backspace grouting or hollow grouting. As a result of intensive and extensive studies, the present inventors have found out the following required conditions for permitting a grouting material to grow into large masses of gel without escaping by splitting of the ground and a mechanism of formation and expansion of masses of the gelled grout.

1. The grouting material of the present invention keeps flowability until it is injected into a ground. However, it does not sprit the ground to spread away after injected into the ground.

2. The grouting material of the present invention reaches plastic gel state before the injection into the ground or it has its flowability lowered by dewatering under pressure after the injection into the ground to form masses of plastic gel.

3. The masses maintain their plastic state in the ground, and the masses are expanded by the plastic gel subsequently pressure-injected therein to grow larger. Peripheral portions of the masses are stretched by the expansion and, as a result, further dewatered and thereby rendered non-plastic to loss flowability. Consequently, solidified zones are formed from the peripheral portions with time to form large solidified masses, and the surrounding earth and sand are pushed outward and voids therein are reduced, and the surrounding earth and sand are thereby statically compacted.

4. Since inner portions of the masses maintain their plastic state, when the grouting material is further injected, the peripheral solidified zones are in part broken, and the plastic gel is pushed out of the breaks and spreads around the breaks and becomes non-plastic by dewatering to enlarge the solidified zones. When the solidified zones harden to a certain hardness level or higher, it is difficult to make breaks in the solidified zones with usual pumping pressure, and accordingly, no further injection is allowed. The sizes of the solidified masses at this time are final sizes.

As a result of the studies, the present inventors have found that injection of the grouting material, which does not give rise to too high a resistant pressure in fluid delivery pipes during fluid delivery or causes no blockage in a pump and which keeps flowability even after injected into a ground from tips of injection pipes placed in the ground and which presents plastic state even after dewatered, enables formation of masses of plastic gel having plastic state retention time (time period in which the gel flows if pressure is exerted thereon) in the ground and further enables the masses to grow. Thus, the present invention has been accomplished.

For example, as shown in Table 1, in formulation 1 and formulation 2 which have the same hardening developing material-powdery matter ratio of 18.50% and respectively have water-powdery matter ratios of 35% and 30%, gelation times are 480 minutes and 300 minutes, respectively. However, when the water-powdery matter ratio is 25%, gelation time is 2 minutes. This means that the grouting material which has not yet reached gel state at the time of blending and before injected into ground has its gelation time reduced to 2 minutes as its water-powdery matter ratio is decreased by dewatering from 35% to 30% (dewatering ratio: about 15%) further to 25% (dewatering ratio: about 30%) and then turns into a plastic gel to form masses. Further, since plastic state retention time is 7.5 hours at the time of the initiation of gelation, the masses are enabled to expand and less susceptible to bleeding and, with its viscosity increasing, less likely to spread away, and the solidified masses have high strengths.

These characteristics have not been known. In other words, the characteristics are such that the fluid grouting material does not reach gelation until it is dewatered to have its water-powdery matter ratio decreased from 35% to 25% after the injected into the ground, and 2 minutes after the ratio reaches 25% (dewatering ratio: about 30%), the grouting material turns into a plastic gel, and since the plastic gel has plastic state retention time of 7.5 hours at this time, the plastic gel grows in size while maintaining its gel state as the injection is continued and further turns into non-fluid gel and solidifies as dewatering or hardening phenomenon proceeds.

Accordingly as described above, although the grouting material is not in a plastic state at the time of injection, it can be rendered plastic by dewatering in the ground. In injection of such a fluid grout, one fluid into which ingredients are formulated may be injected, or a powdery matter-containing injection fluid as fluid A and a fluid containing a gelation accelerator such as an aluminum salt or a water glass as fluid B may be caused to interflow and then injected, or fluid A and fluid B may be a plastic gel and a gelation accelerator such as a water glass, respectively. In other words, grouting operation can be carried out irrespective of injection modes.

As a result of the studies made by the present inventors, a reliable ground improving method is realized which comprises pressure-injecting a plastic gel grouting material into a ground to form large masses in the ground in the following manner, thereby enabling a design based on the increased strength to be made.

1. The grouting fluid which is being injected itself has flowability by pumping. However, the grouting fluid which has been injected into the ground should be prevented from splitting in a vein-like pattern so as not to penetrate in unspecified directions and solidify. This is because only when a mass of solidified gel is formed in each of areas assigned to respective injection holes, voids between soil particles are reduced in each of the assigned areas and increases in density of the ground around the solidified masses and between the injection holes are surely expected.

2. The grouting material injected in the ground is prevented from penetrating between soil particles to thereby push soil particles of the ground between the plurality of injection holes with the masses. This is because if the grouting fluid penetrates between the soil particles, the ground between the plurality of injection holes cannot be compressed, and accordingly, increases in density of the ground in the areas assigned to the injection holes by compression of the ground are not surely expected.

3. The gel pressure-injected into the ground is allowed to form solidified masses and to grow to solidified masses with large diameters. For this purpose:

(1) As the grouting material, there is used one which comprises a mixture of a non-hardening silica type powdery material and water or further comprises a calcium type powdery hardening developing material and which has slump of 5 cm or more and/or table flow of 12 cm or more and/or cylinder flow of more than 8 cm or has slump of 5 cm or more and less than 28 cm and/or table flow of 12 cm or more and less than 30 cm and/or cylinder flow of more than 8 cm and less than 28 cm. This grouting material is pressure-injected into a ground, and masses of the grouting material itself are formed by dewatering, and soil particles are pushed outward by expansion of the masses, and solidified masses are developed in the ground, thereby realizing ground strengthening.

(2) The grouting material is capable of having its table flow brought to 20 cm or less by dewatering. In this connection, a time when the table flow reaches 20 cm is deemed to be a time when the grouting material turns into a plastic gel.

(3) The grouting material becomes non-plastic via plastic gel state and solidifies as dewatering proceeds.

(4) The grouting material is a hardening or non-hardening fluidized soil and has such a formulation that it losses its flowability by dewatering to reach table flow of 20 cm or less, thereby exhibiting a strength equivalent to or higher than that of the surrounding ground.

(5) If the grouting material has such a formulation that it turns into a plastic gel when the water-powdery matter ratio becomes 30% or lower, continuation of injection of the grouting material into the ground leads to transformation of the grouting material into a plastic gel to result in formation of solidified masses.

For growing the masses of plastic gel in the ground to form large solidified masses, the following conditions are preferred.

Hardening developing material-powdery matter ratio: [C/(F+C)]×100(%) is 1% by weight or more and lass than 50% by weight, preferably 1 to 40% by weight, more preferably 1 to 20% by weight.

Water-powdery matter ratio: [W/(F+C)]×100(%) is 20 to 200% by weight, preferably 20 to 100% by weight, more preferably 20 to 50% by weight.

Aluminum-powdery matter ratio: [aluminum/(F+C)]×100 (%) is 0.01 to 0.35% by weight in terms of $Al_2O_3$.

Water glass is used in an amount of 0 to 7.0% by weight in terms of silica.

Slump (cm): slump at the time of injection is 5 cm or more, preferably about 5 to 28 cm, more preferably 10 to 28 cm.

Flow (cm): table flow at the time of injection is 12 cm or more and less than 30 cm, preferably about 15 to 28 cm, and cylinder flow at the time of injection is more than 8 cm and less than 28 cm, preferably about 9 to 26 cm.

Bleeding: bleeding ratio is 10% or less, preferably 5% or less.

There is used such a formulation that the grouting material is a plastic gel or it turns into a plastic gel, i.e., its table flow becomes 20 cm or less with decrease of 30% or less in the water-powdery matter ratio.

4. In injection into vicinity of the ground surface, ground uplift is likely to occur, and the grouting material is likely to escape to the ground surface. Accordingly, measures to prevent such phenomena should also be taken.

5. Capability of maintaining flowability without undergoing phase separation in a long-distance fluid delivery pipe enables workability for applying the technique of the present invention to antiseismic reinforcement of ground in an area closely built-up with architectural structures.

6. To attain applicability not only to sandy ground but also to clayey ground:

The grouting material should maintain flowability (should satisfy the above requirement 5) in the pathway of the grouting material from the blending system to the injection site through delivery pipe and injection pipes, and it also should satisfy any one or more of the above requirements 1, 2, 3 and 4 after injected into the ground.

When it is intended to reduce a time period in which the grouting material turns into a plastic gel, a water glass or an aluminum salt may be added for such adjustment. In other words, these act as gelation accelerators. When an acid water glass obtained by mixing a water glass with an acid such as sulfuric acid to neutralize alkali in the water glass is used, a gel is formed extremely rapidly. In the present invention, an acid water glass is covered by a water glass. In this connection, the gelation time may be adjusted by using sodium bicarbonate or sodium carbonate in combination therewith. Further, gelation retardant such as a lignin sulfonate or the like may be used.

Description is given with respect to a representative example of the grouting material of the present invention. The powdery hardening developing material including cement, slaked lime, slag, gypsum or the like is added to the non-hardening powdery material as a main constituent powdery material of the suspension in an amount of less than 50% by weight, preferably 1 to 40% by weight, more preferably 1 to 20% by weight in the powdery matter used, and the water-powdery matter ratio is 20 to 200% by weight, preferably 20 to 100% by weight. When the gelation accelerator is added, an aluminum salt is mixed in the grouting material in such an amount that ratio of aluminum to the powdery matter contained in the grouting material, i.e., ratio of amount of aluminum to the total amount of the main ingredient and the hardening developing material is 0.1 to 0.2% by weight (in terms of $Al_2O_3$: 0.01 to 0.35%) to thereby obtain such a grouting material that table flow is 12 to 30 cm, preferably 15 to 28 cm, and gelation time is from 3 minutes or shorter to several hundred minutes, and plastic state retention time is several hours to 10 hours or longer, and bleeding ratio is 10% or less, preferably 5% or less, and slump is more than 5 cm and 28 cm or less, preferably 10 to 28 cm, and cylinder flow is more than 8 cm and less than 28 cm, preferably about 9 to 26 cm.

By virtue of these characteristics of the present invention, or by addition of the silica-containing material such as a water glass, an acid water glass or the like as a gelation accelerator, the gelation time and the plastic state retention time can be greatly reduced, and bleeding, slump and also flow can be reduced. The grouting material of the present invention is pressure-injected into a ground and turns into a plastic gel to outward push soil particles and grows to large solidified masses in the ground, thereby realizing ground strengthening.

The grouting material of the present invention shows flow of 12 cm or more, preferably 12 to 30 cm, more preferably 15 to 28 cm, and slump in a range of 5 cm or more and 28 cm or less, preferably 10 to 28 cm. Further, the grouting material may be in plastic state prior to the injection taking formation of a plastic gel in the ground by dewatering under pressure into consideration, or may be one which turns into a plastic gel (about 20 cm or less in terms of table flow) when the water-powdery matter ratio is reduced by 30% or less.

If the flow and the slump are smaller than the ranges, it is difficult to grow solidified masses of plastic gel in the ground. On the other hand, if the flow and the slump are larger than the ranges, the grouting material is injected in a vein-like or crack-like pattern before completion of dewatering, and hence it is difficult to form masses.

As described above, in the present invention, the powdery matter comprising the non-hardening silica type powdery material or further comprising the additional hardening developing material is mixed with water in specific proportions. As the calcium type hardening developing material, any one of combination selected from the group consisting of cement, lime, gypsum and slag (C material) is mixed with water (W material), provided that if the non-hardening silica contains slag, slag is excluded from the hardening developing material.

The slag may be usual one having a blaine of, for example, 4000 ($cm^2/g$) or may be ultrafine particle slag having a blaine of, for example, 6000 to 15000 ($cm^2/g$). The hardening developing material-powdery matter ratio is less than 50% by weight, preferably 1 to 40% by weight, more preferably 1 to 20% by weight. Even if the ratio is 1 to 10% by weight, the hardening developing material exhibits extremely excellent effect. In a case where no hardening developing material is incorporated, it is necessary that slump and flow satisfy the above described requirements, and dewatered masses of the grout injected in a ground have strengths equivalent to or higher than that of the surrounding ground.

In this case, selection of the formulation and the water-powdery matter ratio may be performed as follows. A grouting material is filled in a mold with porous stones or paper filters placed on the top and the bottom, and a pressure corresponding to an intended injection pressure is applied thereto by means of a cylinder to effect dewatering, and strength of the thus obtained specimen is measured, and the selection is so made that the strength is set to be equivalent to or higher than that corresponding to an average soil density of the surrounding ground after the injection. Of course, in a case where the hardening developing material is added in a small amount, the formulation may be determined in the same manner. The water-powdery matter ratio is 20 to 200%, preferably 20 to 100%. In this connection, if the non-hardening silica is slag, the water-powdery matter ratio is more preferably 30 to 80%. Incidentally, the hardening developing material-powdery matter ratio is $[C/(F+C)]\times100(\%)$, and the water-powdery matter ration is $[W/(F+C)]\times100(\%)$, and each of F, C and W is weight thereof. When no hardening developing material is used, the hardening developing material-powdery matter ratio and the water-powdery matter ratio are $(C/F)\times100(\%)$ and $(W/F)\times100(\%)$, respectively.

By mixing, the grouting fluid with such formulation turns into masses sooner or later, i.e., turns into masses spontaneously when the water-powdery matter ratio is low or by dewatering in the ground when the water-powdery matter ratio is high. Plastic gel flows when a force is exerted thereon but stops to flow when released from the force. A gelation point when the grouting material turns into plastic gel is a time point when table flow becomes about 20 cm. The fluid grouting material, which has the water-powdery matter ratio, flow and slump in the above-described ranges, as such or with an additive incorporated therein is dewatered under pressure in the ground, thereby enabling a plastic gel to be formed in the ground even if the water-powdery matter ratio is high.

The masses formed in the ground have low flowability but are required to be fully expanded to form large solidified masses. For this purpose, the flow, the slump and the water-powdery matter ratio are important, and the hardening developing material-powdery matter ratio and the additive are also important.

If the hardening developing material-powdery matter ratio is too high, characteristics of a mortar grout comprising cement or the like as a main ingredient are dominant, and water phase separation is caused to result in high degree of bleeding, and the grout is difficult to turn into a plastic gel, and the grout is likely to turn into a non-plastic gel but not a plastic gel by dewatering to solidify in a short time, thereby forming solidified masses having high strength. Accordingly, the grout is split to spread away or solidifies to allow no further injection. The hardening developing material-powdery matter ratio is less than 50%, preferably 1 to 40%, more preferably 1 to 20%, most preferably 1 to 15%. With such hardening developing material-powdery matter ratio, the grouting material grows in size to form large solidified masses via plastic gel in the ground. In particular, if the hardening developing material-powdery matter ratio is about 1 to 20% or about 1 to 10%, the plastic gel has a moderate strength and its plastic gel state retention time in the ground is long, and thus it is easy to expand, and the improved ground has uniform strength and integrity with the surrounding ground having its density increased to provide excellent earthquake resistance.

Further, in the present invention, the hardening suspension comprising the silica type powdery material, any one or combination of cement, lime, gypsum and slag as the hardening developing material, and water may contain an aluminum salt such as aluminum sulfate, polyaluminum chloride or the like in order to adjust a time period in which the suspension develops plasticity. In this case, the grout has such a formulation that the hardening developing material-powdery matter ratio is preferably 2% by weight or more and less than 50% by weight, and the water-powdery matter ratio is preferably 20 to 60% by weight, and aluminum ratio is 2.0% by weight or less, preferably 0.1 to 1.0% by weight and 0.01 to 0.35% by weight in terms of $Al_2O_3$. In this connection, the aluminum ratio is [aluminum material/(F+C)]×100(%). Incidentally, the aluminum material means weight of the aluminum material.

In the above case, an aluminum salt or a water glass as a gelation accelerator may be mixed with the silica type powdery material and the hardening developing material and then injected into ground with a pump, or the gelation accelerator may be allowed to interflow with the silica type powdery material and the hardening developing material in or near injection pipes, or at a step of injection of a mixed fluid of the silica type powdery material, the hardening developing material and the gelation accelerator, the mixed fluid and a further gelation accelerator may be allowed to interflow and then injected.

Further, in the present invention, gypsum or any one or combination (G) selected from the group consisting of gypsum, cement, lime and slag as the hardening developing material is mixed with water (W). A grout is so prepared as to have such a formulation that gypsum ratio or gypsum-mixture ratio is 1 to 40% by weight, preferably 1 to 20% by weight, and the water-powdery matter ratio is 20 to 70% by weight. Incidentally, the gypsum ratio or gypsum-mixture ratio is $[G/(F+G)]\times100(\%)$, and the water-powdery matter ratio is $[W/(F+G)]\times100(\%)$. G means weight of the gypsum or gypsum-mixture (G).

Further, in the present invention, the non-hardening silica type powdery material as a main ingredient of the powdery matter, i.e., and any one or combination of burned ash, in-situ obtained soil such as clay, earth and sand, and silica sand; and any one or combination of cement, lime, gypsum and slag as the hardening developing material; and water are mixed. Moreover, a gas generating agent or a foaming agent may be added to the grouting material of the present invention to improve flowability or to realize weight reduction. In the above case, by adding bentonite as the clay, or a polymeric viscosity improver such as polyvinyl alcohol, carboxymethylcellulose (CMC), methylcellulose or the like, dispersibility in water is lowered and thus precipitation is reduced to lead to improvement of workability. These additives also serve as a water retention material or as a binder for the powdery matter as the main ingredient to bring the grouting material to pseudo-gel state, thereby forming a fluid which maintains flowability but which is less susceptible to dispersion. As a result, dewatering in the ground is retarded, and expansion of masses is promoted.

The method of the present invention should be expressed as a static plastic gel injection method, it causes no substantial vibrations as caused by a large machine in a sand compaction method, and it does not require large equipment as used in a method comprising injection of mortar with low slump or method comprising injection of mortar having no flowability by means of special equipment. By virtue of this, the method of the present invention can easily be carried out statically using a simple apparatus as used in a usual injection method substantially without noise even in a small or confined operation area. Accordingly, the method of the present invention is highly free of environmental pollution and excellent in workability. Further, injection can be performed through injection pipes which can be disposed by curved boring. This enables oblique or horizontal injection under an architectural structure, and combined curved-horizontal injection for antiseismic reinforcement right under an architectural structure as well.

In the following, description will be given with respect to the manner of carrying out the present invention.

The above-described grouting material according to the present invention is, of course, suitable for filling of voids in a decrepit tunnel, backfilling in a sealed tunnel, filling of voids of foundation, and filling of voids in a back of a revetment, and further suitable for a method in which a grout is injected into a ground and outward pushes soil particles while solidifying into masses to thereby strengthen the ground while pushing the surrounding earth and sand or a grouting method for restoring a subsided ground on which an architectural structure is built, based on the same principle. In the injection of the plastic grouting material, the injection pressure may be set to be low in an initial stage to promote dewatering of previously injected grouting material and then increased stepwise, or the grouting material may be injected intermittently by repeating injection and suspension alternately to thereby prevent penetration of the grout in plastic gel state between soil particles and escape of the plastic gel while splitting the ground, thereby solidifying the plastic gel while outward pushing soil particles to increase density of the ground.

The injection is performed in a concurrent injection mode in which the grouting material is injected from a plurality of injection points, or in an injection mode of switchover from one injection point to another, i.e., a successive injection mode as shown in FIG. 2(b), or in an interval injection mode in which the grouting material is injected while changing an injection point from one to another, and this procedure is repeated, or in a combination of these injection modes.

Further, the grouting material according to the present invention may be injected from a plurality of injection points to retentively hold the ground between the injection points, thereby increasing density of the ground between injection pipes to harden the ground. For expecting to obtain such effect, it is desired that the plurality of the injection pipes be placed in the ground at intervals of 0.5 m to 3 m. If the intervals are larger than this, such a ground improving effect that the entire grout-injected ground has integrity by virtue of increase in soil density cannot be obtained, and the ground is only locally improved. In injection of the grouting material of the present invention, if ground is clayey soil ground or ground with a clayey soil layer, it is effective that drain means be disposed in the ground to carry out the injection while promoting dewatering of the plastic grouting material which has been injected into the ground or dewatering of the ground.

The above-described injection is carried out using, for example, any of injection pipes as shown in (a) to (d) below.

(a) injection pipes each of which has an aperture or discharge port at its tip, (b) injection pipes each of which has a plurality of discharge ports in the axial direction, (c) injection pipes each of which is provided with at least one packer bag in its outer pipe, (d) injection pipes each of which has its pipe wall provided with a discharge port and a water suction port covered with a water-permeable material.

If a large amount of grout is injected at a time to form too large masses of plastic gel with a view to greatly increasing strength of soft ground, weak ground, poor ground, loose ground or the like, uplift is likely to occur at the surface of the ground or the plastic gel tends to laterally split the ground to spread away, bringing about such a situation that the strength of the ground is not increased to an intended level. Accordingly, it is desirable that making use of the characteristics of the grouting material of the present invention, the grouting material be injected at a low discharge rate in an initial stage, and injection pressure be gradually increased, and the injection under injection pressures within a predetermined range be continued to increase volume of the injected grout. From strength of ground (for example, N-value) before injection, injection depth (pressure derived from weight of soil present above), injection pressure, injection amount, and a size of an area assigned to one injection pipe, improved strength after the injection can be estimated. If ground displacement is additionally taken into consideration, more precise estimation can be obtained. Since the grouting material has flowability during the injection and losses the flowability to come to standstill after termination of the injection and turns into gel or is pressure-dewatered to present solidified state, it is also effective that the grouting material be injected repeatedly into subject soil layer in small portions in an interval mode (in which the grout is injected at time intervals) to compact the ground subjected to the injection without breaking the ground and expelled water is allowed to spread between the surrounding soil particles, and compaction of the ground in the lateral direction and dewatering are effected to enlarge diameters of solidified mass of the gel, or that the grout be injected with some time-lags (time differences).

For example, in vertical injection, the grouting material is injected repeatedly in an interval mode to superimpose the grouting material on the previously injected grouting material. By the repeated pressure-injection of the grouting material, compaction and dewatering of the ground in the lateral direction are effected without splitting the ground to effect strengthening of the ground. Alternatively, a predetermined number of bores are formed in a predetermined area of ground, a prescribed amount of the grouting material is injected in parts into each of the bores with predetermined time-lags lest the prescribed amount of the grouting material should be injected in one scoop into one bore. In this manner, with respect to each of the bores, the plastic grout is injected into respective soil layers or at respective stages in the interval mode with the time-lags. The previously injected plastic grout compresses surrounding ground or it is dewatered by self-dewatering or by the injected grouting fluid. Accordingly, by injecting the grouting material in series, the grouting material injected into the large predetermined number of the bores compacts and dewaters the ground in the lateral direction in respective soil layers or at respective stages with respect to each of the bores. By virtue of this, strength is improved, and displacement is inhibited as a whole, and strength of the ground in the predetermined area is enhanced.

For example, injection pipes each having a discharge port are inserted in the ground to a predetermined depth, and while pulling up the injection pipes in such a manner that the discharge port is located within a range in which the grout is in plastic gel state and is not yet in non-plastic gel state, the grout is injected to expand masses of the plastic gel. Further, injection pipes each provided with a bag may be inserted in bores with the bag set in an area near the ground surface, and a suspension type grout is pressure-injected into the bag to expand the bag, thereby compacting the surrounding ground. By virtue of this, the area near the ground surface is improved without escape of the plastic grouting material to the ground surface. Moreover, the grouting material may be pressure-injected below the bag. By the pressure-injection of the grouting material below the bag, the plastic gel from is prevented from running beyond the bag-packed solidified mass, and no displacement such as uplift of the ground is caused by virtue of the restraint effect of the bag, and the strength enhanced by dewatering of the ground extends over the entire area, and improvement of the strength in the area as a whole can be realized.

In this case, the area in which the bag is located is preferably at a depth near the ground surface, for example, a depth in a range of 3 m or less (in particular, 1.5 m or less. This is because even plastic gel is likely to escape from the area to the ground surface. For the same reason, the injection holes may be provided densely in the area near the ground surface to thereby realize uniformized compaction of the ground surface and to thereby prevent uplift of the ground surface. This is because if the grout is injected in a large amount through one injection hole in the area near the ground surface, for example, a depth of 3 m or less (in particular, 1.5 m or less), the grout is likely to escape to the ground surface because of shallow earth covering and ground uplift is likely to occur. Accordingly, the injection holes are provided in this area more densely than in a deeper area to reduce an injection amount per injection hole to thereby enable uniform strengthening of the area near the ground surface to be realized. Further, in ground improvement in the area near the ground surface, ground uplift is likely to be caused because pressure derived from weight of soil present above is low, and the ground uplift tends to amount to several meters in diameter.

It is accordingly desirable that the injection be shifted from one injection hole not to the neighboring injection hole but to another injection hole outside the area subjected to the uplift, and the injection be performed through the neighboring injection hole after calming down of the ground uplift. Further, by pressure-injecting the grouting material stepwise in top-to-bottom order in an area near the ground to compress the ground near the ground surface, and then inserting injection pipes to the bottom of the ground area to be improved, and injecting the grouting material stepwise in bottom-to-top order, ground uplift at the ground surface can be reduced or by virtue of the restraint effect of the upper portion near the ground surface, the lower portion can surely be improved.

Moreover, in the injection according to the present invention, drain means for draining water may also be employed in order to expel water contained in the soil. By intermittent water draining effect (The injection is performed at time intervals, and the draining is performed when the injection is suspended.), compaction and dewatering of the ground in the lateral direction can be promoted or dewatering of the plastic grout can be promoted. (The application of the draining means is suitable for ground strengthening in a clayey soil layer.) Alternatively, drain pipes may be employed to drain ground water, thereby accelerating compaction. In this connection, the drain pipes are placed in such a manner that water suction ports thereof open laterally relative to the injection pipes. This enables drain effect to be obtained in such a manner that excess water contained in the grout or water contained in the soil is sucked up under the same pressure as the injection pressure while pressure-injecting the grout from the discharge ports.

Furthermore, to measure a change such as ground uplift or the like, the change may be measured with a sensor such as a laser in real time to grasp amount of compression of the ground. Alternatively if the change causes deviation from an intended design, the injection of the plastic grout may be adjusted immediately, or injection amount and/or injection depth may be changed by means of a control device of an injection apparatus, or specific gravity and/or injection amount of the grout and/or time interval may be adjusted by automatic switching to shift to another stage before the displacement exceeds a predetermined allowable limit. Improvement of the ground strength by compaction and dewatering as designed is thereby surely attained. With respect to the measurement of ground displacement, besides measurement of the ground uplift at the ground surface, it is possible by placing a measuring rod provided with a stretched strain gauge in the ground to know a change of a ground site in the measurement direction, and it is possible by placing a pore pressure meter in the ground to grasp state of compaction and dewatering.

FIG. 1 shows arrangements of injection. In the present invention, when the grouting material is injected from injection pipes into soft ground, weak ground, poor ground or loose ground at a low rate, plastic gel which makes fluid movement while injection pressure is exerted thereon to expand masses of the gel, but leading portions of the grout injected into the ground loss flowability by decrease in water content of the grout due to water ejection to between the surrounding soil particles by the injection pressure and turn from the plastic gel into non-plastic gel. In this manner, density of soil between injection holes is increased to increase strength of the ground, thereby attaining strengthening of the ground. 0.5-3 m of the distance between the injection holes is effective according to soil property, targeted level of improvement or amount of earth covering.

Then, the present invention is described with reference to FIG. 2 as follows. In this case, the injection is sequentially performed using rod injection pipes in bottom-to-top or top-to-bottom order, as shown in FIG. 2(a). Alternatively, outer injection pipes of double pipe-double packers may be placed in the ground, and the grout is injected from inner pipes through a plurality of discharge ports.

The mode in FIG. 2(b) shows a basic example of the interval mode. Bores 4 each having a predetermined depth are formed in a subject soft, weak, poor or loose ground 3 at predetermined intervals in the lateral direction, and injection pipes 9 are inserted in the bores 4, and from an injection apparatus placed on a ground surface, a suspension type plastic grout is injected at predetermined stages of the injection pipes 9 with predetermined time-lags in an interval mode. Alternatively, the injection is performed repeatedly and cumulatively with respect to each of zones in the ground 3 in ascending or descending order. In this case, rod injection pipes may be used as injection pipes, or the injection may be carried out in such a manner that injection stages are changed from one to another with inner injection pipes inserted in outer injection pipes.

In this case, in each cycle, the grout is injected under low pressure in the initial injection period lest the grout should escape, while draining water contained in the ground 3 or dewatering the grout. After a predetermined time period, the pressure-injection is terminated, and in consequence, the grout loses flowability and solidifies with time as described above. The subsequently injected grout laterally pushes the previously formed masses of plastic gel from within and cumulates in the lateral direction without upward escaping toward the ground surface to realize compaction and dewatering of the lateral ground. At this time, peripheral portions of the masses are dewatered and solidified zones of solidified plastic gel are formed, and plastic gel derived from the subsequently injected grout is cumulatively added to the masses, and the masses thereby grow into large masses.

In this case, in the subject area of the ground 3, the bores are formed at the predetermined intervals in the lateral direction, and an injection pipe 9 is inserted in each of the bores, and the injection pipe are connected to the injection apparatus via valves 5 and a pump P with predetermined time-lags. The grouting material is injected into the bores 4 formed in parallel in the lateral direction with the predetermined time-lags in an interval mode by means of a controller 6 in accordance with a predetermined program to effect compaction and dewatering of the ground between the neighboring bores 4 in the entire area. Consequently, improvement of ground strength in the entire area is realized.

In other words, if the grouting material is pressure-injected in a large amount at a time in a predetermined area through an injection bore, the ground intended to be improved is likely to be broken before the surrounding soil compacts soil in a sufficient extent, or ground uplift is likely to be caused. However, when the grouting material is injected in portions into which the total injection amount is divided at intervals, the injected grouting material stops fluid movement by suspension of the injection and remains at the positions, and solidified masses of plastic gel cumulatively grow around the positions to thereby form a composite ground of the column-like solidified masses and soil therebetween having its density increased.

Of course, in this embodiment, by employing a predetermined interval mode, after the injection is performed sequentially at all the bores 4 at predetermined timing, return may be made to the first bore 4. In the injection of the grouting material in the pipes at the intervals, the formed masses of plastic gel solidify to maintain compaction state of the ground 3. In other words, if the grouting material is pressure-injected in a large amount at a time in a predetermined area through an injection bore, the surrounding ground is likely to be broken before the surrounding soil compacts soil in a sufficient extent. However, when the grouting material is injected in portions into which the total injection amount is divided at intervals, the injected grouting material stops fluid movement by suspension of the injection because of its flowability and remains at the positions, and solidified masses of plastic gel cumulatively grow in size to thereby form a composite ground of the column-like solidified masses and soil therebetween having its density increased.

Accordingly, the injection pressure does not act as a cause of ground uplift but gives rise to compaction in the lateral direction. In this connection, by the function of the plastic gel injected with the predetermined time-lags, displacement is more likely to occur horizontally than vertically. Accordingly, upward displacement along the axial direction of the bores 4 is unlikely to occur, and uplift of the ground 3 is thereby prevented.

FIG. 2(c) illustrates a ground strengthening model where injection pipes 9 each having tensile strength (which may be injection pipes reinforced with tension members) are placed in ground, and a grouting material is pressure-injected through the injection pipes. As shown in FIG. 2(c), the ground is bored, and the injection pipes 9 are embedded therein, and the plastic grout is pressure-injected at predetermined positions to form solidified swellings in the ground, thereby compacting the surrounding soil to form a large ground anchor by the compaction. By the ground anchor, the injection pipes 9 having tensile strengths are firmly held in the ground. By virtue even only of this state, if the ground undergoes displacement, the stretchable pipes stretch to impart tensile strengths to the ground.

In FIGS. 2(a) and (b), in the case where the grout is injected from the outer injection pipes via the inner injection pipes, each outer injection pipe provided with a plurality of discharge ports in the axial direction has its discharge ports each provided with a rubber sleeve which serves as a check valve. In the outer injection pipes, the inner injection pipes having single packers or double packers are inserted, and the grouting material is injected first from the lowermost discharge ports of the outer injection pipes and then at upper steps in ascending order to effect ground strengthening.

In this case, the boring operation for placing the outer injection pipes and the injection operation may be carried out separately. Further, insides of the outer injection pipes may be re-bored to carry out re-injection, and the injection can be performed reliably at each of injection depths, and tensile forces of the outer injection pipes can be imparted to the ground to obtain pile effect.

Moreover, the grouting material of the present invention may be used in combination with a solution type grouting material to thereby improve ground comprising sandy soil and clayey soil layers. Since permeation grouting with a solution type grout is not applicable to clayey soil, veil-like injection of a suspension type grout which has high gel strength has heretofore been applied to the clayey soil. It is, however, possible to inject a suspension type within a predetermined area, and thus effect of vein-like injection of the suspension type is uncertain. In contrast thereto, when the plastic grout is injected using the above-described injection pipes into a soil layer which a solution type grout cannot permeate to effect compaction, it becomes possible to improve the soil layer to which permeation grouting is not applicable with the solution type grout. For example, when injection of a solution type grout is followed by injection of the grouting material of the present invention, it is possible to improve the ground as a whole.

As described above, in the invention of the present application, the grouting material injected in each of the bores 4 compresses and dewaters the ground 3 in the lateral direction and is prevented from upward escaping. Accordingly, ground uplift is unlikely to occur. However, in order to measure uplift at the ground surface or amount of deformation between neighboring bores, a level sensing mode by means of a level sensor may be used as shown in FIG. 3. As shown in FIG. 3, relative to a laser beam generator 11, a laser beam sensor 15 is placed via a laser receiver 12 located at a point at which the ground surface or an architectural structure is considered to be susceptible to influence of the injection.

As shown in FIG. 3, by means of an injection controller 18 for appropriately controlling the injection via the receiver and a computer 17, change of injection stages in the injection pipe 9, amount and interval of the injection of the grouting material, a specific gravity of the grouting material, and the like are controlled. Laser beam emitted from the laser beam generator 11 is received by the receiver 12, and vertical displacement of the receiver 12 is sensed by the precisely manufactured laser beam sensor 15 to thereby precisely sense uplift of the ground 3 or the like. An injection controller (not shown) is started or stopped via the computer 17 to intermittently inject the grouting material at the optimum timing and in the optimum amount for compaction and dewatering in the lateral direction. By virtue of this, the injection is optimally carried out under control of suspension of the injection, adjustment of the injection amount, change to another injection point and the like while measuring ground uplift or the like.

As shown in FIG. 3, since the measurement and detection of displacement of the injected compacting mass in the lateral direction or ground uplift are performed using laser beam or performed optically, measurement with millimeter level precision can be realized.

Accordingly, displacement of the bore 4 or uplift of the ground 3 can be precisely measured over a broad area, and slight displacement such as displacement of the ground 3 can be precisely detected. This enables improvement in strength of the ground as designed to be realized.

In the above-described embodiment, it is basically possible to increase strength of the ground 3 through compaction and dewatering of lateral ground 3. However, there is undesired possibility that water in a part of the ground 3 into which the grouting material is injected runs to another part of the ground 3 to increase flowability of the latter part of the ground 3. Accordingly, in order to eliminate potential cause of liquefaction phenomenon or the like, drain means such as paper drain, sand drain or the like for forced-draining of water in the ground 3 which is expelled in concomitance with the injection of the grouting material may also be placed (through soil layers different in drainage properties or soil properties) to actively effect both compaction and dewatering.

FIG. 4 shows embodiments where bores are formed in a ground to be improved by curved boring, or by combination of curved boring and straight boring, or by horizontally boring from shafts in such a manner that bores extend below a foundation of an architectural structure, and outer injection pipes each having a plurality of discharge ports are placed in the bores, and inner injection pipes are movably inserted into the outer injection pipes, and the present grouting material is thereby injected from outlet ports of the inner injection pipes and through the discharge ports of the outer injection ports into the ground. By virtue of this, supporting soil under an existing structure to which it is difficult to apply grouting can be grouted rapidly, surely and economically to prevent ground subsidence or liquefaction of ground at a time of earthquake.

FIG. 4(*a*) is a basic schematic view of treatment of a ground to be improved just below a structure. As shown in FIG. 4(*a*), bores are formed from points of the ground surface in the vicinity of a ground to be improved just under an untransferable structure such as a building, waste disposal facilities, storage reservoir, impounding reservoir or the like, by curved boring or combination of curved boring and straight boring. Then, the plastic grout is pressure-injected from injection pipes placed in the bores.

FIG. 4(*b*) shows an example of injection into a ground below a stricture, and the treatment may be multi-level treatment in the depth direction under the structure.

In the next place, another embodiment of the present invention is shown in FIG. 5. FIG. 5(*a*) shows a mode where pipes such as casings or the like are placed in a ground, and tension members such as reinforcing bars are inserted therein, and the casings are drawn out while injecting the grouting material to form solidified masses in the ground, and consequently, not only the surrounding soil is compacted and strengthened but also synergistic ground strengthening with the piles effective as compaction piles or tension piles is realized. FIG. 5(*b*) shows a model of strengthening of a ground of pile foundation by pressure-injection of the plastic grout. FIG. 5(*c*) shows a mode for forming anchors in an earth-retaining wall by injection of the plastic grout. In the modes of FIG. 5(*b*) and FIG. 5(*c*), the same procedure as in the mode of FIG. 5(*a*) may be employed, or by using outer pipes each having tensile force and injecting the grout from inner pipes, effect of the outer pipes as tension members may be imparted to the soil.

As an injection managing method in the present invention, injection conditions from formulation of the grout to injection of the grout through a grout delivery system into a plurality of injection points in a ground are shown on a display, and the conditions are thereby monitored en bloc to manage the injection.

Figure 6:
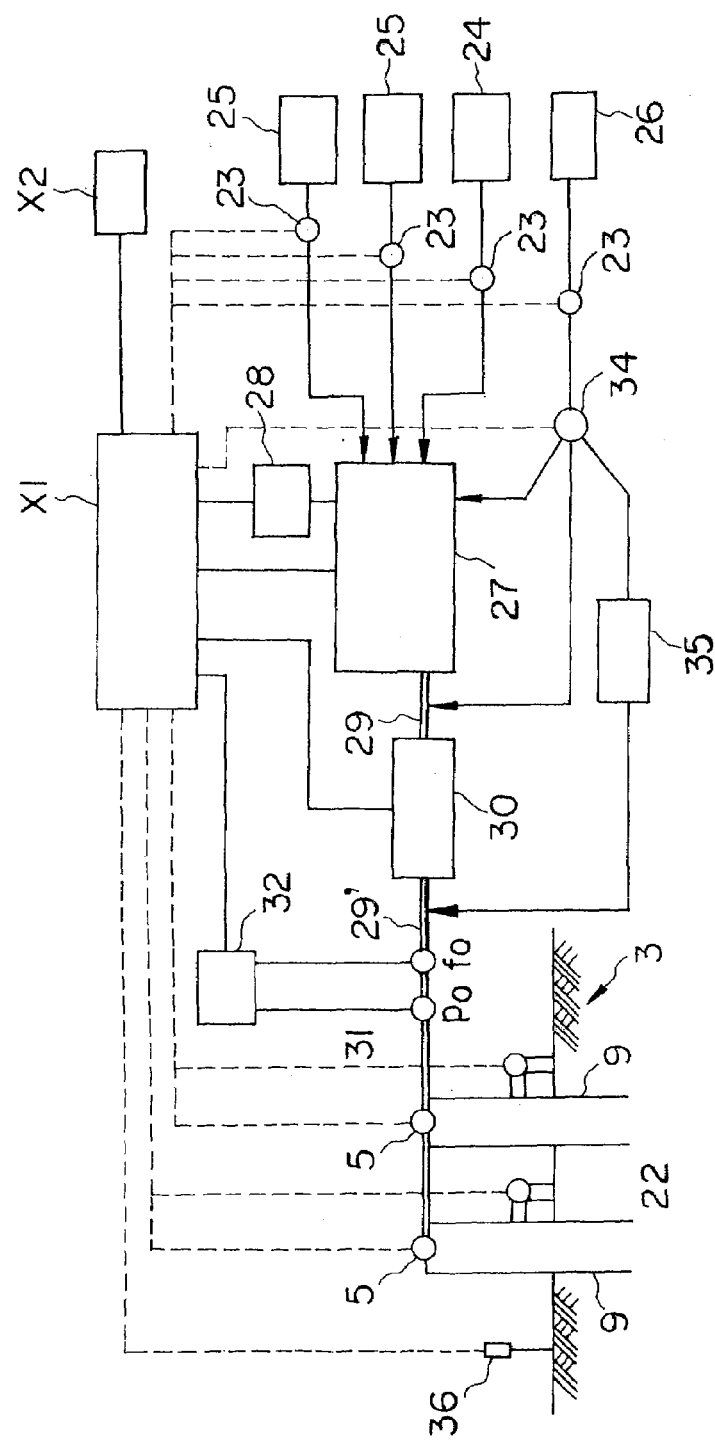
FIG. 6 is a flow sheet showing a specific example of an injection management method in the present invention which covers mixing of ingredients to injection of a grout.

FIG. 6 is a flow sheet showing a specific example of the injection managing method employed in carrying out the present invention. The injection conditions are monitored en bloc and managed by a central management unit X1, and the conditions are always displayed on an injection monitoring panel X2.

Figure 7:
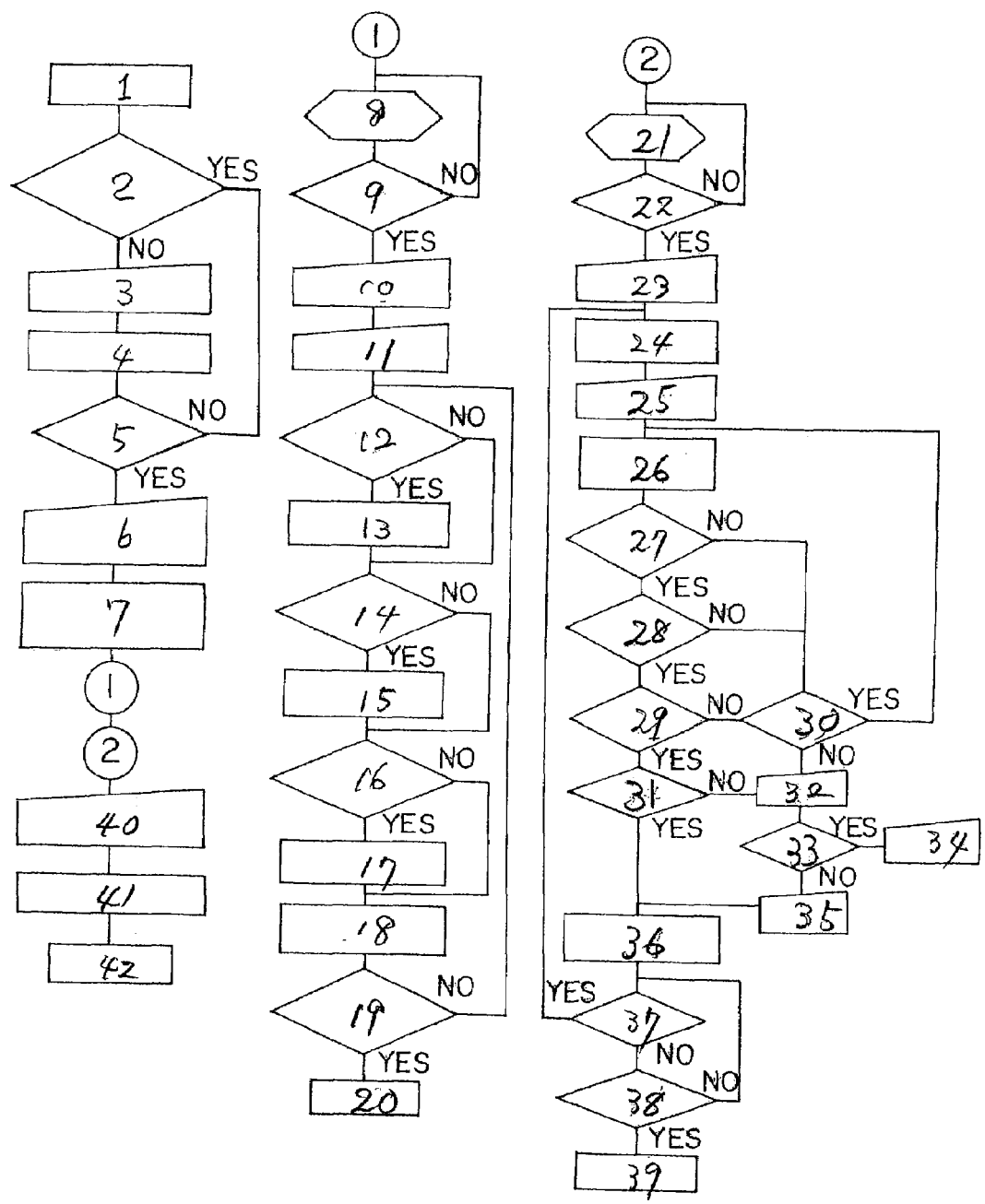
FIG. 7 is a flow chart of operation of a central management unit, and blending and injection which are managed by the central management system.

FIG. 7 shows a flow chart of operation of the central management unit X1, and with reference thereto, FIG. 6 will be described. First, an injection specification file set according to purpose and conditions of injection is preliminarily stored in the central management unit X1 (registration of set system specification), and then a start switch of the central management unit X1 is turned on to initiate data recording. At this time, the injection monitoring panel X2 has its lamp lit as ON indication, and injection data is shown on a display. The injection specification file includes formulation of ingredients, prescribed values of flowability (an appropriate range of flowability) of the grout, prescribed values of pressure (an appropriate range of pressure), and prescribed injection amounts (an appropriate range of accumulated injection value, i.e., desired flow characteristics of the grout, injection pressure, amount [flow volume per time unit (flow rate) and/or accumulated flow volume], and the like. To the above-mentioned injection specification file, an acceptable range of ground uplift may be added.

In accordance with instructions from the central management unit X1, water and powdery materials are supplied to a mixer 27 from a water tank 24 and hoppers 25 for storing the powdery materials, respectively, each of which is provided with a batcher 23 in predetermined amounts, and mixed by stirring. If a gelation accelerator is added at this stage, it is added from a hopper 26 for storing the gelation accelerator through a batcher 23.

The grout sufficiently mixed in the mixer 27 is subjected to flow characteristics measurement by means of a flow characteristics measuring device 28 with which the mixer 27 is equipped or which is separately provided, and the results are shown on the injection monitoring panel via the central management unit X1. The flow characteristics are determined based on flow, sump, gelation time, viscosity, shear strength (determined using cone penetration measurement or the like) of the grout, and the like. When predetermined flowability is obtained, formulation is completed, and the grout is transferred from the mixer 27 through a delivery tube 29 to a grout pump 30. If the predetermined flowability is not obtained, the ingredient or ingredients (water and/or the powdery matter and/or the gelation accelerator) are additionally incorporated in accordance with instructions from the central management unit X1. This is repeated until the predetermined flowability is obtained.

In this connection, the grout can directly be taken out of the mixer 27, and accordingly, it is actually possible to manually determine flowability without aid of the flow characteristics measuring device 28 or the central management unit X1.

The grout transferred to the grout pump 30 is advanced to injection step. In accordance with instructions from the central management unit X1, a valve 5 is opened, and the grout pump 30 applies predetermined pressure to the grout. The pressurized grout is pressure-injected into a ground 3 through a delivery tube 29', an injection hose 31, and an injection pipe 9.

A pressure gauge $p_0$ and a flow meter $f_0$ are attached to the delivery tube 29', and data on measured injection pressure and flow volume [flow volume per time unit (flow rate) and/or accumulated flow volume] are transmitted to a flow volume and pressure controlling device 32 and managed by the central management unit X1. If the injection pressure or the flow volume is out of the prescribed pressure value range (appropriate pressure range) or out of the prescribed flow volume value range (appropriate accumulated flow volume range), or if a level of ground uplift exceeds the acceptable range, the injection is suspended, or instructions to adjust or to control are transmitted from the central management unit. Further, since the data is always displayed on the injection monitoring panel, change of injection conditions or emergency stop of the injection can be made according to state of the injection.

As the flow meter $f_0$, any flow meter, for example, a rotary flow meter or an electromagnetic flow meter may be used. The flow volume in the form of an electrical signal outputted therefrom in pulses is inputted to the central management unit X1 and counted. By instructions from the central management unit X1 which are based on the information from the flow meter $f_0$ and/or the pressure gauge $p_0$, number of rotations of the grout pump 30 is adjusted to control the flow volume per minute or the injection pressure.

On the basis of the instructions of the central management unit X1, the number of rotations of the pump may be adjusted by means of an inverter to control the flow volume.

The grout pump 30 may be one having an inverter or a non-stage transmission, or one having a return mechanism. The flow volume may be adjusted directly by the inverter or non-stage transmission without instructions from the central management unit X1 to brig the pressure to the predetermined value. The flow volume may be adjusted also directly by the return mechanism to allow the pressure in the delivery tube 29' to maintain the predetermined pressure by returning the pressure. Incidentally, the above-described adjustment of the flow volume may be performed manually.

Instead of the grout pump 30, a compressor may be used. In this case, a pressure vessel is provided. The grout is charged into the vessel from the mixer 27, and the grout in the pressure vessel is pressurized by the action of the compressor to prepare pressurized injection grout.

A valve 5 is attached to a injection pipe 9, and the valve 5 is opened or closed in response to electrical signals from the central management unit X1. Using a plurality of injection pipes 9, injection is carried out by parallel injection, sequential injection, interval injection or a combination thereof from a plurality of injection points 22 in a ground 3. The valves 5 may be closed manually when the injection is completed.

After the injection is completed as a whole, recording of data in the central management unit X1 is completed by turning a start switch of the central management unit X1 off.

The data from the formulation to the injection is transmitted to the central management unit X1 and displayed on the injection monitoring panel 2 to thereby collectively monitor the state of the injection. Under the monitoring, the injection is carried out while maintaining the flow characteristics of the grout, the injection pressure of the fluid delivery system, and the flow volume in the predetermined ranges, and completion, suspension, continuation or resumption of the injection is effected.

By providing a branching valve (shunt valve) 34 for the gelation accelerator which is automatically opened or closed in accordance with instructions from the central management unit X1, incorporation time of the gelation accelerator is controlled. By preliminarily registering the incorporation time of the gelation accelerator in the system specifications, the gelation accelerator may be mixed in the mixer 27, or added prior to delivery to the grout pump 30, or added to the grout pumped from the grout pump 30 through a gelation accelerator pump 35.

The grouting method employed in the present invention is characterized in that as shown in FIG. 6, the flow characteristics measuring device 28, the flow volume and pressure controlling device 32, the equipment for measuring displacement of the ground (or a structure), and the valve 5 which can be opened or closed automatically are provided, and these are connected to the central management unit X1, and data is displayed on the injection monitoring panel X2. On the injection monitoring panel X2, there are shown "time-related data" such as date of the injection, an injection time and the like, "grout-related data" such as incorporation amounts of the ingredients, grout properties and the like, "position-related data" such as injection block numbers, hole numbers of injection holes and the like, and "injection-related data" such as injection pressure, flow volume [flow volume per time unit (flow rate) or accumulated flow volume] and the like. Besides these, grout differentiating data or data on displacement of a ground (or a structure) may be shown.

For example, FIG. 8 shows a picture of data on grout delivery systems (flow rates, pressures, accumulated flow volumes and maximum pressures: 40 data in total) in injection carried out using 10 grout delivery systems, which picture is displayed in one screen. The picture in FIG. 8 will be described in detail as follows.

Two parts of the upper half of the picture are:

Group 1: digital display of accumulated flow volumes and maximum pressures in No. 1 to No. 5 grout delivery systems Group 2: digital display of accumulated flow volumes and maximum pressures in No. 6 to No. 10 grout delivery systems The accumulated flow volumes are those in a period of 20 minutes. The maximum pressures are updated every 30 minutes. The maximum pressures shown in the picture are those in a period from 19 minutes and 30 seconds to 20 minutes. If the maximum pressure continues to be higher than the prescribed pressure, this is a criterial sign to discontinue the injection from the corresponding grout delivery system. If the accumulated flow volume reaches the prescribed accumulated volume, this is also a criterial sign to discontinue the injection from the corresponding grout delivery system.

Two parts of the lower half of the picture are:

Group 3: trend display of flow rates and pressures in No. 1 to No. 5 grout delivery systems Group 4: trend display of flow rates and pressures in No. 6 to No. 10 grout delivery systems Each of left columns of the two parts of the picture lower half shows charts of momentary flow rates and momentary pressures in the grout delivery systems along lapse of time (t), and each of right columns of the two parts shows average momentary flow rates (l/min) and average momentary pressures (M Pa) in a period from 19 minutes and 30 seconds to 20 minutes.

In this manner, as shown in FIG. 8, grout delivery states in the grout delivery systems No. 1 to No. 10 are displayed en bloc on the injection monitoring panel X2. However, the grout delivery states may be displayed separately in such a manner that one frame is allotted to each of the grout delivery systems. In this connection, the prescribed pressures, real pressures, grout flow rates and accumulated grout flow volumes in the flow volume and pressure controlling device 32 may be displayed in the same picture or a different picture. By virtue of this, relationships with pressures and flow rates can be grasped in real time, and accordingly, the injection can be so controlled that the conditions are within the predetermined ranges. In FIG. 8, instead of the maximum pressures, pressures or flow rates may be displayed. Further, by means of the central management unit X1, an injection specifications file, a tabulated list of injection results, an injection chart, a document such as a daily journal, a weekly journal, a monthly journal or the like, and analytical data can be prepared.

The injection specifications file is an operation setting file for the central management unit X1 and specifies the prescribed pressure value and the prescribed injection amount as injection termination conditions for the grout delivery systems. Each of document files is prepared by converting each of data on the registered flow rate, pressure, accumulated flow volume and maximum pressure, and data on manual or automatic inputting of hole numbers. The analytical data is prepared by converting each of the documents.

Figure 9:
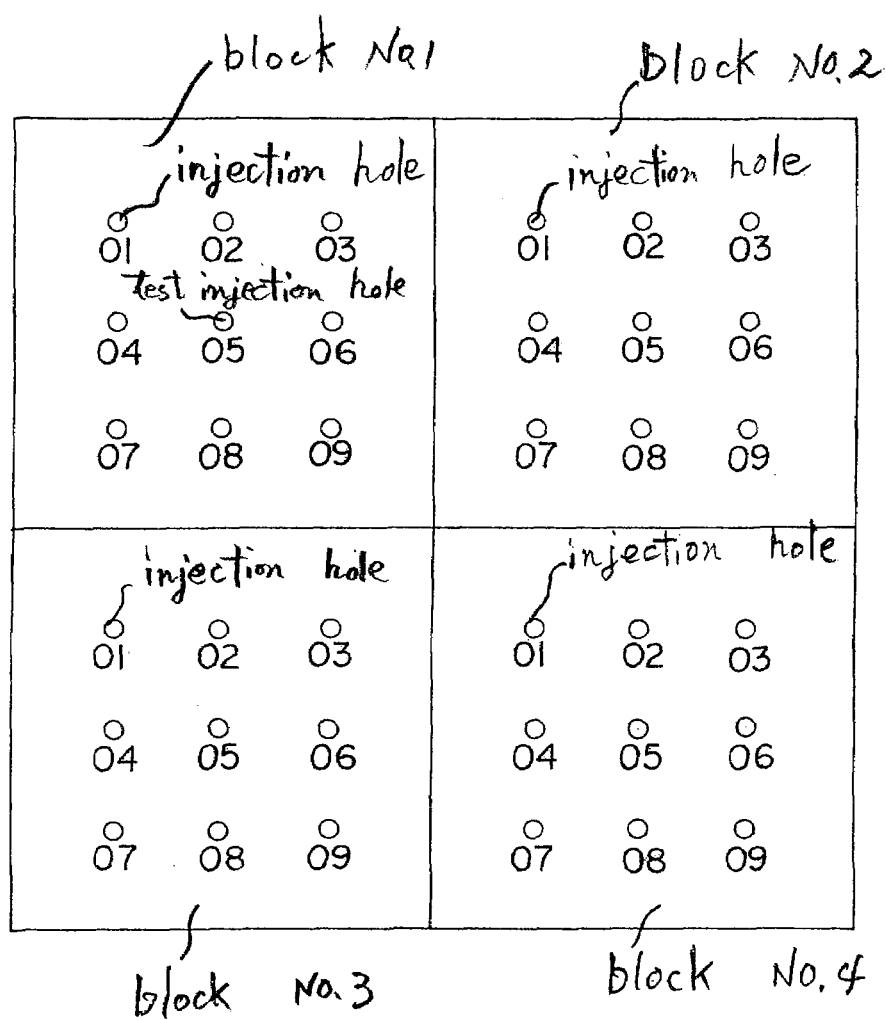
FIG. 9 is an example of indication picture of four injection blocks No. 1 to No. 4 in an injection area, which is displayed on the injection monitoring panel.

With respect to the display of the injection monitoring panel X2 in FIG. 8, for each of the grout delivery systems, for example, for each of injection points in injection holes as shown in FIG. 9, a pressure, a flow rate and charts may be displayed in one picture together with a block number, an injection hole number and a stage number.

Figure 10:
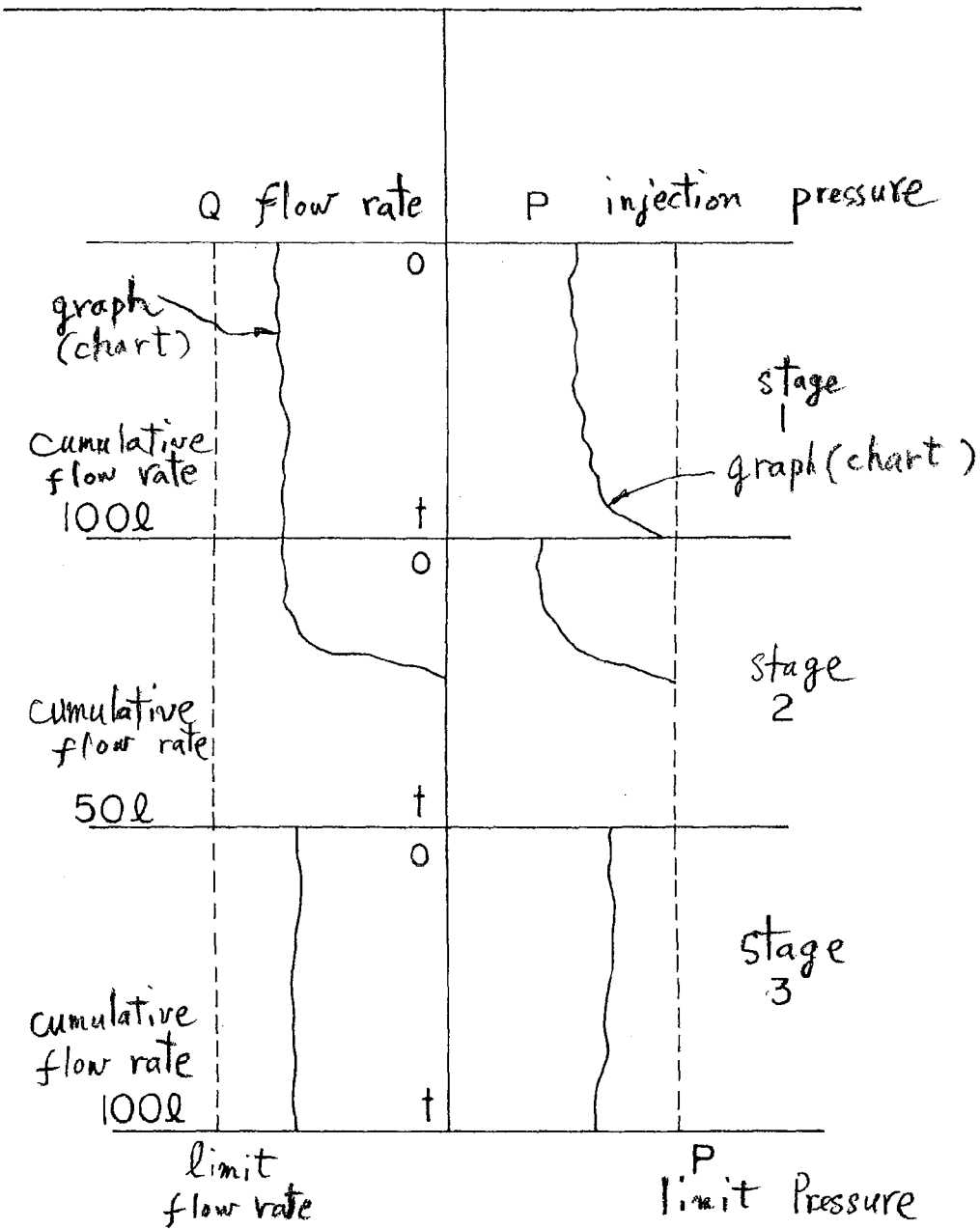
FIG. 10 is a graphical representation (chart) of flow rates and injection pressures at stages No. 1 to No. 3, which is displayed on the injection monitoring panel.
Figure 11:
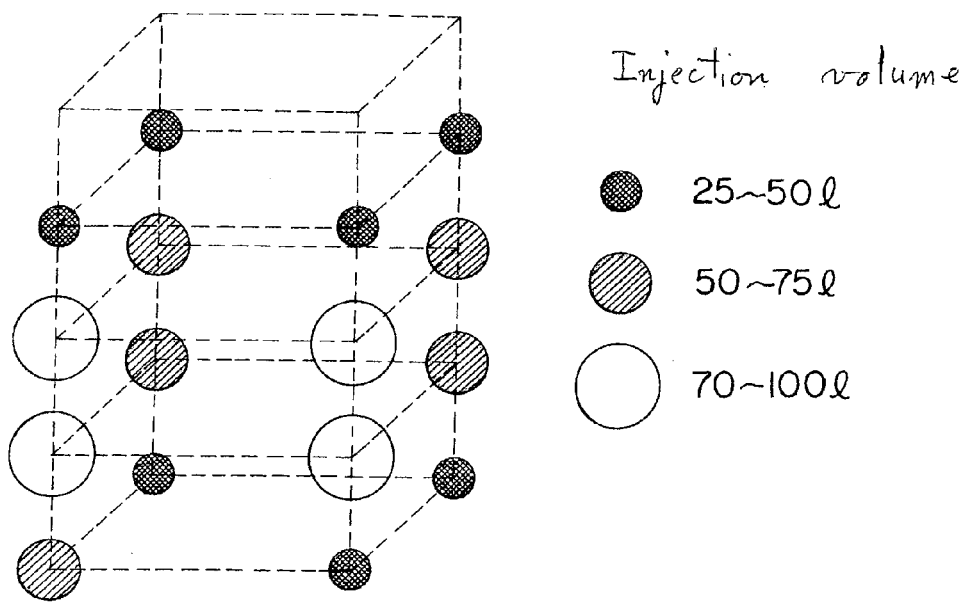
FIG. 11 is an example of three-dimensional representation of injection volumes or injection pressures.

Further, with respect to each injection hole, for example, No. 3 injection hole in No. 1 block in FIG. 9, injection pressure P, flow rate Q and accumulated flow volume along time (t) in each of stages may be displayed, as shown in FIG. 10. Further, as shown in FIG. 11, these data may be shown three-dimensionally based on an allowable injection pressure or a range of injection pressure estimated from an N-value and a pressure derived from a weight of earth covering at each injection stage, and an allowable injection amount estimated from on a targeted N-value. It is possible to forecast in real time ground improving effect corresponding to a post-injection intended N-value from a pre-injection N-value from an injection amount at each injection stage.

In this manner, with the predetermined flow rate or predetermined pressure, or with a flow rate or pressure in a limited range of the pressure-injected grout, the grout is delivered and pressure-injected. As a result, the injection can be surely effected, and further, effect of the improvement can be estimated. Further, the above-described predetermined pressure or predetermined injection amount may be modified taking results of test injection into consideration.

The present invention will be described specifically hereinbelow on the basis of Examples. It should be noted, however, that the present invention is be no means restricted by these Examples.

Used Ingredients (1) Fly Ash coal ash discharged from a thermal power plant: FA, a silica type non-hardening powdery matter, density: 1.9-2.3 g/cm$^3$, particle size distribution: 90% or more of particles have a particle size of 1 mm or less.

(2) Cement ordinary Portland cement: PC, hardening developing material (3) Aluminum Sulfate aluminum sulfate, $Al_2O_3$=17.2%, gelation accelerator (4) Water Glass JIS (Japanese Industrial Standard) No. 3 water glass, $SiO_2$=29.0%, $Na_2O$=9.0%, molar ratio 3.3, gelation accelerator (5) Slaked Lime industrial calcium hydroxide, gelation accelerator and hardening developing material (6) Slag slag having a specific surface area of 8000 measured by a Blaine air permeability meter, hardening developing material and silica type non-hardening powdery matter (7) Gypsum hemihydrate gypsum, hardening developing material (8) Incinerated Ash incinerated ash discharged from an incinerator, silica type non-hardening powdery matter, density: 2.5-2.7 g/cm$^3$ (9) Bentonite water retention agent and viscosity improver

(10) Foaming Agent pre-foaming type gas generating agent

(11) Aluminum Powder post-foaming type gas generating agent

Formulation Examples 1 to 3

Fly ash, cement and water are mixed. Amounts of fly ash and cement were the same through these Examples, and only amount of water was changed. Preparation conditions and values of physical properties of the thus obtained grouting materials in Formulation Examples 1 to 3 are shown in the following Table 1.

TABLE 1

| | | | | | | | | | | values of physical properties | |
|---|---|---|---|---|---|---|---|---|---|---|---|
| F. Ex. | fly ash g | cement g | water ml | h-p ratio % | w-p ratio % | g. time min | p. ret. time hr | b. ratio % | flow value cm (e.t.) | initial viscosity cps | one-day strength MN/m$^2$ |
| 1 | 400 | 35 | 153 | 8.05 | 35 | 480 | 12 | 3.0 | 20 (8 hr) | 740 | 0.31 |
| 2 | 400 | 35 | 131 | 8.05 | 30 | 300 | 11 | 2.0 | 20 (5 hr) | 950 | 0.56 |
| 3 | 400 | 35 | 109 | 8.05 | 25 | 2 | 7.5 | 0.7 | 20 (2 min) | 2100 | 0.84 |

F. Ex.: Formulation Example,
h-p ratio: hardening developing agent-powdery matter ratio,
w-p ratio: water-powdery matter ratio,
g. time: gelation time,
p. ret. time: plastic state retention time,
b. ratio: bleeding ratio,
(e.t.): (elapsed time)

In Table 1, the gelation time means a time period from blending to a time at which the grout turns into plastic gel. In other words, a time period until table flow becomes about 20 cm is regarded as the gelation time. The plastic state retention time means a time period in which the grout maintains its gel state when allowed to stand still but flows when a force is applied thereto.

Formulation Examples 4 to 6

Fly ash, cement and water are mixed. Amount of water was the same through these Examples, and amounts of fly ash and cement were changed. Preparation conditions and values of physical properties of the thus obtained grouting materials in Formulation Examples 4 to 6 are shown in the following Table 2.

TABLE 2

| | | | | | | | values of physical properties | | | |
|---|---|---|---|---|---|---|---|---|---|---|
| F. Ex. | fly ash g | cement g | water ml | h-p ratio % | w-p ratio % | g. time min | p. ret. time hr | b. ratio % | flow value cm (e.t.) | initial viscosity cps | one-day strength MN/m² |
| 1 | 400 | 35 | 153 | 8.05 | 35 | 480 | 12 | 3.0 | 20 (8 hr) | 740 | 0.31 |
| 2 | 370 | 65 | 153 | 14.94 | 35 | 420 | 7 | 4.5 | 20 (7 hr) | 1020 | 1.50 |
| 3 | 217.5 | 217.5 | 153 | 50.00 | 35 | 360 | 2 | 6.0 | 20 (6 hr) | 4000 | 4.32 |

F. Ex.: Formulation Example,
h-p ratio: hardening developing agent-powdery matter ratio,
w-p ratio: water-powdery matter ratio,
g. time: gelation time,
p. ret. time: plastic state retention time,
b. ratio: bleeding ratio,
(e.t.): (elapsed time)

It is understood from Table 2 that when the hardening developing agent-powdery matter ratio is increased, the bleeding ratio becomes higher, and the plastic state retention time becomes shorter, and the initial viscosity becomes higher, and the water-powdery matter ratio is rapidly decreased by dewatering and the grout is likely to be injected in a vein-like pattern. Accordingly, a hardening developing agent-powdery matter ratio of less than 50% is appropriate. The hardening developing agent-powdery matter ratio is preferably 1 to 20%, more preferably 1 to 15%, and most preferably 1 to 10%. In the present invention, cement may not be Portland cement, and any type of cement, for example, blast furnace cement, alumina cement, high early strength cement or slag cement may be used.

Formulation Examples 7 and 8

Aluminum sulfate was added to the grouts of Formulation Examples 1 and 2 to accelerate gelation. The acceleration of gelation means reduction of a time period from blending to a time at which the grout shows plasticity or reduction of flow. Preparation conditions and values of physical properties of the thus obtained grouting materials in Formulation Examples 7 and 8 are shown in the following Table 3.

It is understood from Table 3 that by the addition of aluminum sulfate, the gelation time is reduced but the plastic state retention time is not so reduced, and the bleeding ratio is also reduced, and thus workability as the plastic grout can be improved. In this connection, however, since aluminum sulfate has properties to lower strength development, it is incorporated in an amount of 2.0% or smaller, preferably 1.0% or smaller relative to the powdery matter.

[Factors and Conditions as Plastic Grout]

(1) Hardening Developing Agent-Powdery Matter Ratio

The hardening developing agent-powdery matter ratio is a ratio of amount of cement (hardening developing agent) to amount of powdery matter contained in the grout, i.e., amount of fly ash and cement: {weight of cement (hardening developing material)/[weight of fly ash (silica type non-hardening powdery material)+weight of cement (hardening developing agent)]}×100 [%].

Cement is a hardening developing agent and may be regarded as a plasticizer for fly ash. When fly ash is mixed with cement, fly ash initiates pozzolanic reaction to develop solidification strength. However, as the hardening developing agent-powdery matter ratio is increased, characteristics as a plastic grout become poorer. In other words, such a grout is

TABLE 3

| Formulation Example | fly ash g | cement g | water ml | aluminum sulfate g |
|---|---|---|---|---|
| 7 | 400 | 35 | 153 | 2.16 |
| 8 | 400 | 35 | 131 | 2.16 |

| | | | | | values of physical properties | | | | |
|---|---|---|---|---|---|---|---|---|---|
| F. Ex. | h-p ratio % | w-p ratio % | amt. of AS % | g. time min | p. ret. time hr | b. ratio % | flow value mm aft. 5 min | aft. 30 min | initial viscosity cps | one-day strength MN/m² |
| 7 | 8.05 | 35 | 0.5 | 45 | 14 | 0.8 | x | 21.0 | 1070 | 0.10 |
| 8 | 8.05 | 30 | 0.5 | 5 | 8 | 0.5 | 20 | 18.5 | 1800 | 0.21 |

F. Ex.: Formulation Example,
h-p ratio: hardening developing agent-powdery matter ratio,
w-p ratio: water-powdery matter ratio,
amt. of AS: amount of aluminum sulfate,
g. time: gelation time,
p. ret. time: plastic state retention time,
b. ratio: bleeding ratio
Note)
In this Table, x means "cannot be measured".

susceptible to precipitation and thus high degree of bleeding, and the precipitate is hard to flow and hard to turn into a plastic gel. Accordingly, an appropriate range of the hardening developing agent-powdery matter ratio is 50% or less. The hardening developing agent-powdery matter ratio is preferably in a range of 1 to 20%, more preferably 1 to 15%, further preferably 1 to 10%, when aluminum sulfate (gelation accelerator) is not added. When aluminum sulfate is added, the hardening developing agent-powdery matter ratio is 2 to 40%, preferably 2 to 20%.

(2) Water-Powdery Matter Ratio

The water-powdery matter ratio is a ratio of amount of water to amount of the powdery matter in the grout; {weight of water/[weight of fly ash (silica type non-hardening powdery material)+weight of cement (hardening developing agent)]}×100 [%].

When the value of this ratio is low, the grout becomes plastic easily. In other words, a time period from blending to a time at which the grout turns into a plastic gel is reduced, and flow value is reduced. However, if the water-powdery matter ratio is too low, workability is impaired. Accordingly, it is appropriate that the water-powdery matter ratio is in a range of 20 to 200%. The water-powdery matter ratio is preferably in a range of 20 to 100%, more preferably 20 to 50% (weight ratio). However, when water glass is used as a gelation accelerator, the water-powdery matter ratio may be higher. In this connection, properties of the grout also depend upon other factors such as mixing conditions, environment, and ingredients. Accordingly, measurements of a bleeding ratio, a flow value, and strength which are described below are important.

(3) Amount of Added Aluminum Sulfate

The amount of added aluminum sulfate is a ratio of amount of added aluminum sulfate to amount of powdery matter in the grout: {weight of aluminum sulfate/[weight of fly ash (silica type non-hardening powdery material)+weight of cement (hardening developing agent)]}×100 [%].

Aluminum sulfate is a gelation accelerator. When aluminum sulfate is added to cement in a fluid state, gelation is accelerated to reduce a time period for the fluid to turn into a plastic gel. However, aluminum sulfate also has adverse activity to lower solidification strength. Accordingly, the amount of aluminum sulfate is 2.0% or less, preferably 0.1 to 1.0%.

(4) Gelation Time

The term "gelation" used herein does not mean chemical gelation into a solidified state as seen in a usual water glass type grout. A physical gelation time from blending to a time at which the grout turns into a plastic gel that no longer flows by gravity but flows by a force applied thereto is expressed as the gelation time. In this connection, in contrast to a usual water glass-based grout, it is impossible to indicate a definite gelation time in the grout used in the present invention. Accordingly, a time point at which a flow value becomes 20 cm or less is regarded as a gelation point, and a time period from blending to this time point is regarded as the gelation time.

(5) Plastic State Retention Time

In accordance with JIS K 2530-1961 cone-into-asphalt penetration test method, penetration resistance was measured using a penetration cone having a total mass of 230 g, an apex angle of 15 degrees, and a height of 36 mm. A time point when the penetration resistance exceeds 0.01 MN/m$^2$ was regarded as a solidification or hardening point at which a plastic gel turns into a non-plastic gel, and a time period from the gelation to the solidification was regarded as the plastic state retention time.

(6) Bleeding Ratio

After blending, the grout is sufficiently mixed. Then, the grout is charged in a 200 ml measuring cylinder and allowed to stand for 1 hour with the measuring cylinder sealed. Thereafter, a volume of bleeding water (supernatant liquid) is measured, and a bleeding ratio is calculated and found according to the following formula. (volume of bleeding water/volume of the measuring cylinder)×100 [%]

Figure 12:
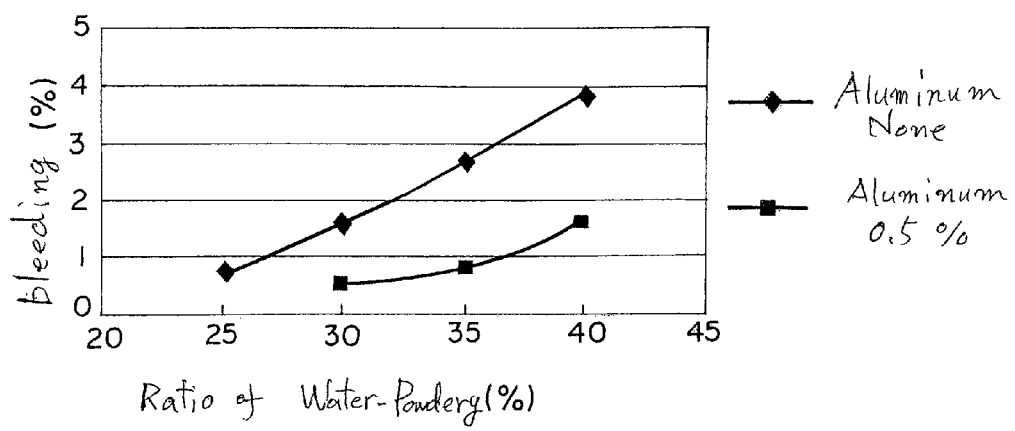
FIG. 12 is a graph showing difference in bleeding ratio between a grout containing aluminum sulfate and a grout containing no aluminum sulfate.

The bleeding ratio used herein is the bleeding ratio after one hour time lapse. If a formulation the grout is such that the bleeding ratio after one hour time lapse is more than 10% the grout is susceptible to phase separation and likely to be injected in a vein-like or crack-like pattern. Thereafter, the bleeding ratio further increases as time passes. Accordingly, such a formulation is preferred that the bleeding ratio after one hour time lapse be 10% or less, further preferably 5% or less. In FIG. 12, there are shown relationships between the water-powdery matter ratio and the bleeding ratio in the case of Table 1 where no aluminum sulfate is added and the case of Table 3 where aluminum sulfate is added.

(7) Flow Value

Figure 15:
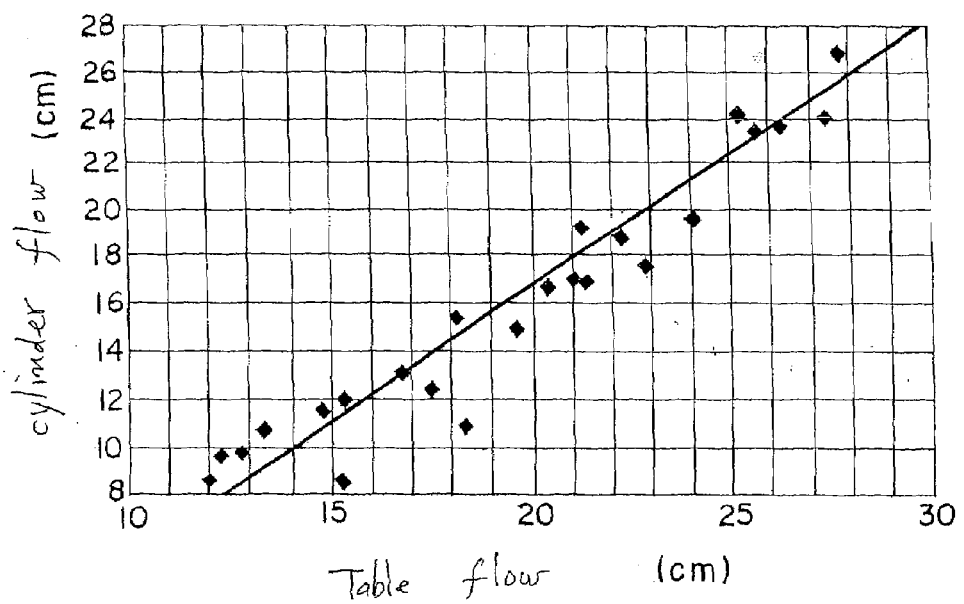
FIG. 15 is a graph showing relationship between table flow and cylinder flow.

In accordance with Flow Test (JIS R 5201 Table Flow), the grout is subjected to descending movement 15 times in 15 minutes, and a spread thereof was measured. It is generally considered to be appropriate that a plastic grout has a flow value of about 18 to 19 cm. In the present invention, however, at a time when a flow value reached 20 cm or less, flowability by gravity was considered to be lost, and the time was regarded as gelation time point. For the fluid grout in the present invention, such a formulation is employed that after injection into a ground, the water-powdery matter ratio is lowered by compaction and dewatering, and the table flow consequently reaches 20 cm or less. A cylinder flow is determined by filling a cylinder of 8 cm in height and 8 cm in diameter with the grout, removing the cylinder, and measuring a spread of the grout. The cylinder flow can be measured simply and easily as compared with the above-described table flow. Accordingly, the cylinder flow is often employed in the field. However, human-induced error is likely to occur because of simplicity and easiness. In FIG. 15, approximate relationship between the table flow and the cylinder flow is shown.

In such formulation as described above, even if the water-powdery matter ratio is high, the water-powdery matter ratio is brought to 20% or lower in the ground by dewatering, and a plastic gel solidifies through a non-plastic gel.

(8) Initial Viscosity

Figure 13:
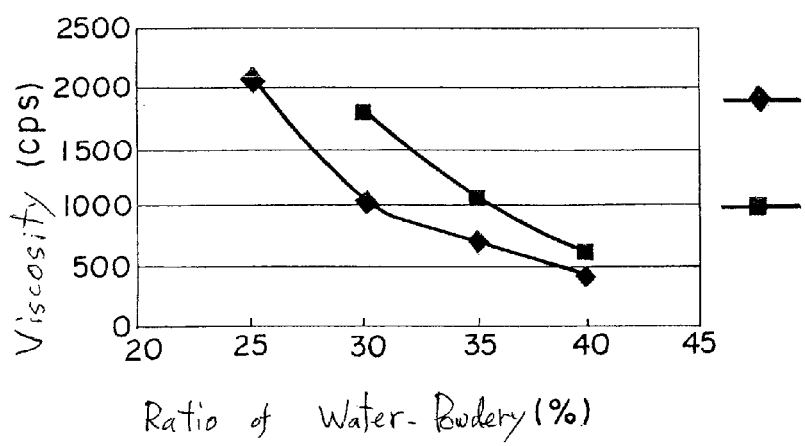
FIG. 13 is a graph showing difference in initial viscosity between the grout containing aluminum sulfate and the grout containing no aluminum sulfate.

Viscosity of a blended fluid immediately after blending was measured using a viscometer of B model. The viscosity could be measured immediately after the blending because the fluid had flowability at that time, but the viscosity becomes 100000 cps or more after gelation and thus cannot be measured. In FIG. 13, there are shown relationships between the water-powdery matter ratio and the (uniaxial compressive strength) viscosity in the case of Table 1 where no aluminum sulfate is added and in the case of Table 3 where aluminum sulfate is added.

(9) Uniaxial Compressive Strength

Figure 14:
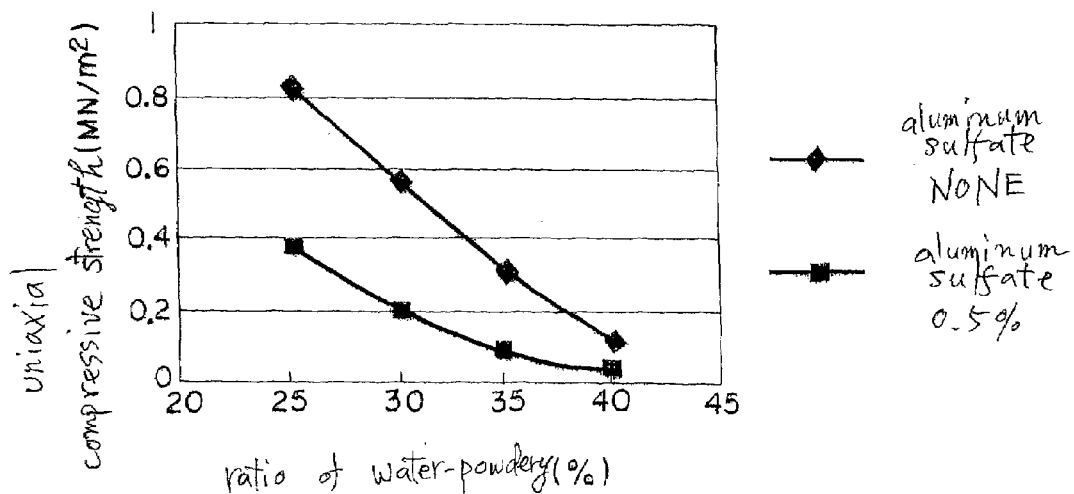
FIG. 14 is a graph showing difference in strength development between the grout containing aluminum sulfate and the grout containing no aluminum sulfate.

After blending, sufficiently mixed grout was charged in a mold of 5 cm in diameter and 10 cm in height and allowed to stand still for one day to effect curing, and then uniaxial compressive strength was measured. In FIG. 14, there are shown relationships between the water-powdery matter ratio and the uniaxial compressive strength in the case of Table 1 where no aluminum sulfate is added and in the case of Table 3 where aluminum sulfate is added.

According to FIG. 14, the strength is decreased by the addition of aluminum sulfate. Further, the grout having a higher water-powdery matter has a longer time period until solidification of the grout, and hence, shows strength development slower than that in the grout having a lower water-powdery matter ratio.

Formulation Examples 9 to 11

Water glass is diluted with water, and a suspension prepared by mixing fly ash, cement and water is mixed therewith. Preparation conditions and values of physical properties of the thus obtained grouting materials of Formulation Examples 9 to 11 are shown in the following Table 4.

TABLE 4

| Formulation Example | Fluid B | | Fluid A | | | |
|---|---|---|---|---|---|---|
| | water glass ml | water ml | fly ash g | cement g | slaked lime g | water ml |
| 9 | 20 | 110 | 200 | 20 | 10 | 171 |
| 10 | 20 | 110 | 200 | 20 | 20 | 166 |
| 11 | 25 | 105 | 200 | 20 | 20 | 171 |

| | values of physical properties | | | | | | | | |
|---|---|---|---|---|---|---|---|---|---|
| F. Ex. | h-p ratio % | w-p ratio % | amt. of SL % | $SiO_2$ % | g. time min | p. ret. time hr | b. ratio % | flow value cm | | strength $MN/m^2$ |
| | | | | | | | | aft. 5 min | aft. 30 min | one day |
| 9 | 9.09 | 127.51 | 4.55 | 1.51 | 40 | 1.7 | 0.5> | x | 22 | 0.15 |
| 10 | 9.09 | 125.45 | 9.09 | 1.86 | 30 | 1.3 | 0.5> | x | 20 | 0.19 |
| 11 | 9.09 | 125.24 | 4.55 | 1.88 | 1 | 1 | 0.5> | 16 | 15 | 0.21 |

F. Ex.: Formulation Example,
h-p ratio: hardening developing agent-powdery matter ratio,
w-p ratio: water-powdery matter ratio,
amt. of SL: amount of slaked lime,
g. time: gelation time,
p. ret. time: plastic state retention time,
b. ratio: bleeding ratio,
0.5>: less than 0.5

(1) Amount of Added Slaked Lime

The amount of added slaked lime is a ratio of amount of added slaked lime to amount of the powdery matter in the grout: {weight of slaked lime/[weight of fly ash (silica type non-hardening powdery material)+weight of cement (hardening developing material)]}×100 [%].

Slaked lime is a gelation accelerator, and as in the case of cement, initiates pozzolanic reaction when mixed with fly ash. However, solidification strength obtained in the case of slaked lime is not so high as in the case of cement. In these Formulation Examples, slaked lime is used as a gelation accelerator for bringing the grout into plastic state and for obtaining plastic state retention effect. The amount of slaked lime depends on the amount of cement incorporated. However, the amount of slaked lime is preferably in a range of 3 to 15%.

(2) Silica Concentration

The silica concentration is a amount of $SiO_2$ in the grout: percentage of $SiO_2$ in water glass×(weight of water glass/weight of the grout) [%].

According to experiments made by the present inventor, to bring the grout into plastic state and solidify the grout, the silica concentration is in a range of 0.2 to 7.0, although the silica concentration is dependent on proportions of other incorporated ingredients. However, when a low molar ratio water glass having a molar ratio equal to or lower than that of No. 3 water glass is used, the silica concentration is preferably 3.0 to 7.0%. Of course, a water glass having a high molar ratio or a powdery water glass may be used. Further, an acid water glass prepared by mixing a water glass and an acid may be used as a gelation accelerator. In the present invention, an acid water glass is also referred to as a water glass.

(3) Characteristics and Comparison

As characteristics of the formulations in Table 4, it may be mentioned that the gelation time can be adjusted with ease, and that early development of strength is remarkable although the plastic state retention time is somewhat short. Accordingly, the formulations are suitable for a case where importance is placed on early development of strength. By providing an aqueous solution of water glass as Fluid B in addition to the plastic grout as Fluid A, a gelation time of Fluid A can be reduced. Further, by mixing well the grout after gelation, the plastic state retention time can be prolonged although early strength development is reduced. Injection of the grout which has well been mixed is suitable for a case where injection for a long period of time is required or for ground improvement where the grout is injected into injection points repeatedly at intervals in such a manner that the grout is further injected into the injection points into which the grout has already been injected to expand masses of the grout.

Formulation Example 12

In Formulation Example 2, cement is used as a hardening developing agent. In this Formulation Example, however, slaked lime is used as a hardening developing agent in the same incorporation amount. Preparation conditions and values of physical properties of the thus obtained grouting material in Formulation Example 12 are shown in the following Table 5.

TABLE 5

| F. Ex. | fly ash g | slaked lime g | water ml | h-p ratio % | w-p ratio % | g time min | p. ret. time hr | b. ratio % | flow value cm aft 5 min | flow value cm aft 30 min | one-day strength MN/m² |
|---|---|---|---|---|---|---|---|---|---|---|---|
| 12 | 400 | 35 | 130.5 | 8.05 | 30 | 4 | 20 | 2.0 | 19.6 | 18.9 | 0.09 |

F. Ex.: Formulation Example,
h-p ratio: hardening developing agent-powdery matter ratio,
w-p ratio: water-powdery matter ratio,
g. time: gelation time,
p. ret. time: plastic state retention time,
b. ratio: bleeding ratio

Formulation Example 13

In Formulation Example 2, cement is used as a hardening developing agent. In this Formulation Example, however, slag is used as a hardening developing agent in the same incorporation amount. Preparation conditions and values of physical properties of the thus obtained grouting material in Formulation Example 13 are shown in the following Table 6.

TABLE 6

| F. Ex. | fly ash g | slag g | water ml | h-p ratio % | w-p ratio % | g. time min | p. ret. time hr | b. ratio % | flow value cm (elapsed) | one-day strength MN/m² |
|---|---|---|---|---|---|---|---|---|---|---|
| 13 | 400 | 35 | 130.5 | 8.05 | 30 | 180 | 17 | 1.2 | 20 (3 hr) | 0.27 |

F. Ex.: Formulation Example,
h-p ratio: hardening developing agent-powdery matter ratio,
w-p ratio: water-powdery matter ratio,
g. time: gelation time,
p. ret. time: plastic state retention time,
b. ratio: bleeding ratio

Formulation Example 14

In this Formulation Example, gypsum is used as a hardening developing agent. Preparation conditions and values of physical properties of the thus obtained grouting material in Formulation Example 13 are shown in the following Table 7.

TABLE 7

| F. Ex. | fly ash g | gypsum g | water ml | h-p ratio % | w-p ratio % | g. time min | p. ret. time min | b. ratio % | flow value cm (elapsed) | one-day strength MN/m² |
|---|---|---|---|---|---|---|---|---|---|---|
| 14 | 400 | 35 | 208.8 | 8.05 | 48 | 4 | 15 | 0.5 | 14.5 (5 min) | 0.08 |

F. Ex.: Formulation Example,
h-p ratio: hardening developing agent-powdery matter ratio,
w-p ratio: water-powdery matter ratio,
g. time: gelation time,
p. ret. time: plastic state retention time,
b. ratio: bleeding ratio (1) Hardening Developing Agent-Powdery Matter Ratio The hardening developing agent-powdery matter ratio is a ratio of amount of the hardening developing agent to amount of the powdery matter contained in the grout: {weight of the hardening developing agent/[weight of fly ash (silica type non-hardening powdery material)+weight of the hardening developing agent]}×100 [%].

The hardening developing agent corresponds to PC (Portland cement) added in each of Formulation Examples 1 to 11, and thus the ratio corresponds to the PC-powdery matter ratio in each of Formulation Examples 1 to 11. In Formulation Example 12 to 14, slaked lime, slag and gypsum are used as the hardening developing agents, respectively. Accordingly, in these Formulation Examples, the ratios correspond to slaked lime-, slag-, and gypsum-powdery matter ratios, respectively. In this connection, in each of Formulation Examples 9 to 11, since slaked lime is used as a gelation accelerator, slaked lime is used for different purpose, and accordingly the hardening developing agent-powdery matter ratio is indicated exclusive of slaked lime.

(2) Characteristics of Formulation Example 12 and Comparison

In a case where slaked lime is used as the hardening developing agent, when slaked lime is added to fly ash, it initiates polazzonic reaction as in the case of cement. However, since the reaction proceeds very slowly, although the grout turns into gel state, it takes the grout a long time to solidify, and it takes several weeks to obtain sufficient solidification strength. However, when slaked lime is used as the hardening developing agent, the grout turns into gel state more easily as compared with the case where cement is used as the hardening developing agent in the same amount. It is, accordingly, considered that excellent effect can be expected by using slaked lime in combination with cement.

(3) Characteristics of Formulation Example 13 and Comparison

When slag is used as the hardening developing agent, the grout turns into gel in a time slightly shorter than that in the case of cement and has a longer plastic state retention time. However, the results are similar to those in the case of cement. Incidentally, strength development is slower than that in the case of cement.

(4) Characteristics of Formulation Example 14 and Comparison

When gypsum is used as the hardening developing agent, because of rapid reaction of gypsum, the grout turns into plastic state easily, but the grout has an extremely short plastic state retention time due to rapid development of strength.

Formulation Examples 15 and 16

As a two-part grout system, a grout into which fly ash, cement, water and a plasticizer has been formulated and which turns into plastic state and solidifies with time and a additional plasticizer were prepared. The additional plasticizer was added to the above grout to shorten gelation time. Using the above-described grout of Formulation Example 7 into which fly ash, cement, water and a plasticizer was formulated, an aqueous aluminum sulfate solution (Formulation Example 15) or an aqueous solution prepared by diluting water glass with water (Formulation Example 16) was added to the grout in such a state that it has flowability before gelation. The ratio of the grout of Formulation Example 7: the aqueous solution of the additional plasticizer was 20:1. Preparation conditions and values of physical properties of the thus obtained grouting material of Formulation Examples 15 and 16 are shown in Tables 8 and 9, respectively.

TABLE 8

| Formulation Example | Fluid A grout of Formulation Example 7 * ml | Fluid B | |
|---|---|---|---|
| | | aluminum sulfate g | water ml |
| 15 | 400 | 4.5 | 17.95 | values of physical properties

| F. Ex. | h-p ratio % | w-p ratio % | amt. of AS % | g. time min | p. ret. time hr | b. ratio % | flow value mm | | two-day strength MN/m$^2$ |
|---|---|---|---|---|---|---|---|---|---|
| | | | | | | | aft. 5 min | aft. 30 min | |
| 15 | 8.05 | 38.6 | 1.38 | 35 | 30 | 0.3 | 24.2 | 21.0 | 0.18 |

* The grout of Formulation Example 7 is a plastic grout.
F. Ex.: Formulation Example,
h-p ratio: hardening developing agent-powdery matter ratio,
w-p ratio: water-powdery matter ratio,
amt. of AS: amount of aluminum sulfate,
g. time: gelation time,
p. ret. time: plastic state retention time,
b. ratio: bleeding ratio

TABLE 9

| Formulation Example | Fluid A grout of Formulation Example 7 * ml | Fluid B | |
|---|---|---|---|
| | | water glass g | water ml |
| 16 | 400 | 9.85 | 10.15 | values of physical properties

| F. Ex. | h-p ratio % | w-p ratio % | amt. of AS % | SiO$_2$ % | g. time min | p. ret. time hr | b. ratio % | flow value mm | | one-day strength MN/m$^2$ |
|---|---|---|---|---|---|---|---|---|---|---|
| | | | | | | | | aft. 5 min | aft. 30 min | |
| 16 | 8.05 | 38.6 | 0.5 | 0.56 | 1 | 1.5 | 1.2 | 19.5 | 16.6 | 0.42 |

* The grout of Formulation Example 7 is a plastic grout.
F. Ex.: Formulation Example,
h-p ratio: hardening developing agent-powdery matter ratio,
w-p ratio: water-powdery matter ratio,
amt. of AS: amount of aluminum sulfate,
g. time: gelation time,
p. ret. time: plastic state retention time,
b. ratio: bleeding ratio (1) Characteristics of Formulation Examples 15 and 16 and Comparisons When an aqueous solution prepared by diluting water glass with water is added to the grout of Formulation Example 7 in the form of a plastic grout, the gelation time becomes extremely short, and the plastic state retention time also becomes short, and strength development becomes remarkable. Accordingly, the resulting grout is suitable for a case where importance is placed on early development of strength. In the case where Fluid A is the plastic grout and Fluid B is the aqueous solution of water glass, masses of gel are easily formed by means of Fluid A-Fluid B mixture grout.

Formulation Example 17

Incinerated ash was mixed with fly ash in Formulation Example 3 in Table 1. (Instead of the fly ash in Formulation Example 3 in Table 1, a mixture of fly ash and incinerated ash was used. ?) Mixing ratio of fly ash to incinerated ash is 1:1. Preparation conditions and values of physical properties of the thus obtained grouting material of Formulation Example 17 are shown in the following Table 10.

TABLE 10

| Formulation Example | fly ash g | incinerated ash g | cement g | water ml |
|---|---|---|---|---|
| 17 | 200 | 200 | 35 | 108.8 |
| values of physical properties | | | | |

| F. Ex. | h-p ratio % | w-p ratio % | g. time min | p. ret. time hr | b. ratio % | flow value mm aft. 5 min | aft. 30 min | one-day strength MN/m² |
|---|---|---|---|---|---|---|---|---|
| 17 | 8.05 | 25 | 3 | 10 | 0.3 | 19.1 | 18.4 | 0.32 |

F. Ex.: Formulation Example,
h-p ratio: hardening developing agent-powdery matter ratio,
w-p ratio: water-powdery matter ratio,
g. time: gelation time,
p. ret. time: plastic state retention time,
b. ratio: bleeding ratio Formulation Example 18

Volcanic ash was mixed with fly ash in Formulation Example 1 in Table 1. (Instead of the fly ash in Formulation Example 3 in Table 1, a mixture of fly ash and volcanic ash was used. ?) Mixing ratio of fly ash to volcanic ash is 3:1. Preparation conditions and values of physical properties of the thus obtained grouting material of Formulation Example 18 are shown in the following Table 11.

TABLE 11

| Formulation Example | fly ash g | volcanic ash g | cement g | water ml |
|---|---|---|---|---|
| 18 | 300 | 100 | 35 | 152.5 |
| values of physical properties | | | | |

| F. Ex. | h-p ratio % | amt of VA % | w-p ratio % | g. time min | p. ret. time hr | b. ratio % | flow value cm (elapsed) | one-day strength MN/m² |
|---|---|---|---|---|---|---|---|---|
| 18 | 8.05 | 22.99 | 35 | 2 | 9 | 0.3 | 18.5 (5 min) | 0.25 |

F. Ex.: Formulation Example,
h-p ratio: hardening developing agent-powdery matter ratio,
amt of VA: amount of volcanic ahs,
w-p ratio: water-powdery matter ratio,
g. time: gelation time,
p. ret. time: plastic state retention time,
b. ratio: bleeding ratio Formulation Example 19

Cement as a hardening developing agent was added to fly ash, and bentonite was mixed therein. Preparation conditions and values of physical properties of the grouting material of Formulation Example 19 are shown in the following Table 12.

TABLE 12

| Formulation Example | fly ash g | cement g | bentonite g | water ml |
|---|---|---|---|---|
| 19 | 400 | 18 | 13 | 160.2 |
| values of physical properties | | | | |

| F. Ex. | amt of PC % | w-p ratio % | g. time min | p. ret. time hr | flow value mm aft. 5 min | aft. 30 min | one-day strength MN/m² |
|---|---|---|---|---|---|---|---|
| 19 | 4.18 | 37.17 | 7 | 7 | 21.0 | 19.5 | 0.10 |

F. Ex.: Formulation Example,
amt of PC: amount of PC,
w-p ratio: water-powdery matter ratio,
g. time: gelation time,
p. ret. time: plastic state retention time Formulation Example 20

Fine aggregate (mountain sand) was mixed in fly ash, and cement as a hardening developing agent was added thereto. Preparation conditions and values of physical properties of the grouting material of Formulation Example 20 are shown in the following Table 13.

TABLE 13

| Formulation Example | fly ash g | fine aggregate (mountain sand) g | cement g | water ml |
|---|---|---|---|---|
| 20 | 140 | 360 | 10 | 110 | values of physical properties

| F. Ex. | h-p ratio % | amt of FA % | w-p ratio % | g. time min | p. ret. time hr | b. ratio % | flow value cm (elapsed) | one-day strength MN/m² |
|---|---|---|---|---|---|---|---|---|
| 20 | 1.96 | 70.59 | 21.57 | 3 | 8.5 | 1.2 | 19.8 (5 min) | 0.25 |

F. Ex.: Formulation Example,
h-p ratio: hardening developing agent-powdery matter ratio,
amt of FA: amount of fine aggregate,
w-p ratio: water-powdery matter ratio,
g. time: gelation time,
p. ret. time: plastic state retention time,
b. ratio: bleeding ratio Formulation Example 21

Fly ash and cement were mixed with muddy water. Preparation conditions and values of physical properties of the grouting material of Formulation Example 21 are shown in Table 14.

TABLE 14

| Formulation Example | fly ash g | cement g | muddy water | |
|---|---|---|---|---|
| | | | clay g | water ml |
| 21 | 260 | 20 | 65 | 235 | values of physical properties

| F. Ex. | h-p ratio % | amt of clay % | w-p ratio % | g. time min | p. ret. time hr | b. ratio % | flow value cm (elapsed) | one-day strength MN/m² |
|---|---|---|---|---|---|---|---|---|
| 18 | 8.05 | 22.99 | 35 | 2 | 9 | 0.3 | 18.5 (5 min) | 0.25 |

F. Ex.: Formulation Example,
h-p ratio: hardening developing agent-powdery matter ratio,
amt of clay: amount of clay,
w-p ratio: water-powdery matter ratio,
g. time: gelation time,
p. ret. time: plastic state retention time,
b. ratio: bleeding ratio (1) Water-Powdery Matter Ratio The water-powdery matter ratio is a ratio of amount of water to amount of the powdery matter in the grout: {weight of water/[weights of fly ash, and incinerated ash or volcanic ash (silica type non-hardening powdery material)+weight of cement (hardening developing agent)+weight of bentonite, fine aggregate or clay (extender)]}×100 [%].

In these Formulation Examples, as other powdery ingredients than the hardening developing agent and fly ash, there were used incinerated ash, volcanic ahs, bentonite and fine aggregate. As a mixing water, a muddy water containing clay was also used. In addition, on-site obtained soil, silica sand or the like may be used. These may be used as an extender or an aggregate. Further, particle diameter or grain size thereof may be selected to thereby adjust flow properties or strength. Alternatively, by addition of clay, the grout may be used as fluidized soil even without using the hardening developing agent.

(2) Characteristics of Formulation Examples 17 and 18 and Comparisons

When Formulation Example 17 in Table 10 is compared with Formulation Example 3 in table 1, Formulation Example 17 in which incinerated ash was incorporated had a reduced bleeding ratio and a smaller flow value. Further, comparison of Formulation Example 18 in Table 11 with Formulation Example 1 in Table 1 also resulted in similar results. When incinerated ash or volcanic ash is incorporated in addition to fly ash, the grout tends to loss blowability easily and tends to have reduced strength development as compared with the case where only fly ash is used as a silica type non-hardening material. The hardening developing agent-powdery matter ratio is 50% or less, preferably 1 to 20%. The water-powdery matter ratio is preferably 20 to 150%.

(3) Characteristics of Formulation Example 19 and Comparison

By the addition of bentonite to fly ash and cement, viscosity of the grout was increased, and the gelation time was reduced as compared with the Formulation where the grout had the same water-powdery matter but no bentonite was incorporated. However, the plastic state retention time was sufficiently maintained. By using bentonite, flowability can be adjusted with ease. Further, use of bentonite increases viscosity of the grout, and this enables inhibition of escape of the grout into water. The hardening developing agent-powdery matter ratio is 50% or lower, preferably 3 to 40%, and water-powdery matter ratio is preferably 20 to 150%.

(4) Characteristics of Formulation Example 20 and Comparison

Fine aggregate (mountain sand) may be mixed with fly ash and cement. However, if amount of the fine aggregate is large, the bleeding ratio tends to be high. It is, accordingly, preferred that the amount of the fine aggregate be 80% or less. The hardening developing agent-powdery matter ratio is 50% or lower, preferably 1 to 20%, and the water-powdery matter ratio is preferably 20 to 150%.

(5) Characteristics of Formulation Example 21 and Comparison

The grout prepared by mixing fly ash and cement in a muddy water has increased viscosity by virtue of clay contained in the muddy water, and also has improved flowability and water retention properties. Accordingly, the muddy water is effective as a viscosity improver, a fluidizer or a water retention material and has effect to expand masses of plastic gel in the ground. It is, therefore, possible to adjust properties of the grout by selecting amount of the clay contained in the muddy water. The hardening developing material-powdery matter ratio is 50% or lower, and the water-powdery matter ratio is preferably 20 to 150%.

Formulation Examples 22 and 23

As a gas generating agent, a pre-foaming type foaming agent (Formulation Example 22) or a post-foaming type aluminum powder (Formulation Example 23) was added to a mortar comprising fly ash and cement. Formulations 22 and 23 are shown Tables 15 and 16, respectively. The gas generating agents have effects to improve flowability as well as to lower density of solidified grout.

TABLE 15

| Formulation Example | fly ash g | cement g | foaming agent g | water ml |
|---|---|---|---|---|
| 22 | 162 | 54 | 0.8 | 130 |

| | | | values of physical properties | | | | |
|---|---|---|---|---|---|---|---|
| F. Ex. | h-p ratio % | w-p ratio % | amt of FA % | b. ratio % | g. time min | p. ret. time hr | flow value cm (elapsed) |
| 22 | 25.00 | 60.2 | 1.48 | 0.5 | 270 | 10 | 19.8 (5 hr) |

F. Ex.: Formulation Example,
h-p ratio: hardening developing agent-powdery matter ratio,
w-p ratio: water-powdery matter ratio,
amt of FA: amount of foaming agent,
b. ratio: bleeding ratio,
g. time: gelation time,
p. ret. time: plastic state retention time

TABLE 16

| Formulation Example | fly ash g | cement g | aluminum powder g | water ml |
|---|---|---|---|---|
| 23 | 162 | 54 | 0.02 | 130 |

| | | | values of physical properties | | | | |
|---|---|---|---|---|---|---|---|
| F. Ex. | h-p ratio % | w-p ratio % | amt of AP % | b. ratio % | g. time min | p. ret. time hr | flow value cm (elapsed) |
| 22 | 25.00 | 60.2 | 0.01 | 3.0 | 120 | 5 | 20.0 (2 hr) |

F. Ex.: Formulation Example,
h-p ratio: hardening developing agent-powdery matter ratio,
w-p ratio: water-powdery matter ratio,
amt of AP: amount of aluminum powder,
b. ratio: bleeding ratio,
g. time: gelation time,
p. ret. time: plastic state retention time (1) Amount of Added Foaming Agent The amount of added foaming agent is a ratio of amount of the foaming agent to amount of cement contained in the grout: (weight of the foaming agent/weight of cement)×100 [%].

Then the amount of added foaming agent is preferably 0.5 to 1.5% (weight ratio to cement).

(2) Amount of Added Aluminum Powder

The aluminum powder reacts with an alkali such as cement to generate hydrogen gas (occurrence of foaming). If the amount of added aluminum powder is defined as a ratio of aluminum powder content to powdery matter content in the grout (aluminum ratio): [weight of aluminum powder/weight of powdery matter]×100 [%], an aluminum ratio of about 0.01% is effective.

(3) Characteristics of Formulation Examples 22 and 23 and Comparison

The gas generating agents had effects to improve flowability as well as to lower density of solidified grout.

Formulation Examples 24 and 25

Slag, cement and water were mixed, The slag is used as a main ingredient, and the cement is used as a hardening developing material. Formulations 24 and 25 are shown in Table 17.

TABLE 17

| | | | | | | values of physical properties | | | |
|---|---|---|---|---|---|---|---|---|---|
| F. Ex. | slag g | cement g | water ml | h-p ratio % | w-p ratio % | g. time min | p. ret. time hr | b. ratio % | flow value cm (elapsed) | one-day strength MN/m² |
| 24 | 400 | 35 | 261 | 8.05 | 60 | 90 | 10 | 0.5 | 20.8 (1 hr) | 1.15 |
| 25 | 400 | 35 | 217.5 | 8.05 | 50 | 2 | 8 | 0.5 | 18.5 (5 min) | 4.32 |

F. Ex.: Formulation Example,
h-p ratio: hardening developing agent-powdery matter ratio,
w-p ratio: water-powdery matter ratio,
g. time: gelation time,
p. ret. time: plastic state retention time,
b. ratio: bleeding ratio When comparison is made between the cases where fly ash was used as a main ingredient and the cases where slag is used as a main ingredient, slug has higher reactivity with cement. In comparison with Formulation Example 2, although the hardening developing material-powdery matter ratio is the same and the water-powdery matter ratio is twice, the gelation time is shorter and development of strength is remarkable. In these cases, the hardening developing material-powdery matter ratio is preferably 50% or lower, more preferably 1 to 20%, and water-powdery matter ratio is preferably 20 to 150%, more preferably 30 to 80%.

Field injection experiment according to the present invention was carried out. Grouts of which Formulation Examples are as shown in Table 18 were used. The subject ground was a sandy soil ground having an N-value of 7, a relative density of 40%, and a fine grain content of less than 20%. As Comparative Examples, there are given Comparative Example 1 of a conventional water glass suspension type flash-setting formulation (hereinafter referred to simply as "flash-setting formulation") (gelation time: 10 seconds, plastic state retention time: no), and Comparative Example 2 of LW (gelation time: 1 minute, plastic state retention time: no). Formulations of Comparative Examples 1 and 2 are shown in Tables 19 and 20, respectively. Examples using Formulation Examples in Example 1 are shown in Table 18. With respect to mixing of a blended fluid and formation of plastic gel and profile of injection, classification into Groups A to F is made. Solidification states examined in excavation investigations are shown as I to VI. As is seen from Table 18, in each of the injections in Group A, when the blended fluid was mixed in a mixer after blending to transform the blended fluid into a plastic gel and pressure-injected until no further pressure-injection was allowed, a roughly spherical solidified mass of the plastic gel was formed. With respect to growth of the mass of the plastic gel, when a formulation has such water-powdery matter ratio and hardening developing material-powdery matter ratio that the plastic state retention time is long and strength is not high, a large mass is formed.

In each injection in Group B, when the injection was initiated in such a condition that the blended fluid did not yet turn into a plastic gel in a mixing step by means of a mixer, and the blended fluid turned into a plastic gel in the course of the injection, and the injection was continued until no further injection was allowed, a solidified mass having a hardly definable shape was formed within the subject area of the injection. This is considered to be attributable to the circumstance that the blended fluid having sufficient flowability was injected toward low injection-resistant weak parts of the ground at the initial stage of the injection, and its flowability lowered as dewatering proceeded to form a mass, and the grout which had turned into plastic state before (in the course of ?) the injection was further injected, and the mass was thereby expanded and solidified. In this case, even if the mass was not spherical, the weak parts were mainly compacted. Accordingly, even if the mass had a hardly definable shape, sufficient improvement effect could be obtained.

In each injection in Group C, the blended fluid did not turn into a plastic gel during blending and until completion of the injection at the stage, and injection pressure increased as injection time passed, and finally no more blended fluid could be injected and no further injection was allowed. According to excavation investigation, the blended fluid had high flowability at the initial stage of the injection. Due to this, the blended fluid was partially fracture-injected to the outside of the allotted area in a vein-like pattern. However, the blended fluid lost flowability in the ground by dewatering, a plastic gel was formed and a mass of the plastic gel grew in size in the allotted area, and thereby, effect to compact and strengthen the surrounding ground could be obtained.

In each injection in Group D, the grout was an ordinary water glass grout having no plastic state retention time after gelation, and thus injection pressure increased on gelation. If the grout was further injected, the grout was fracture-injected in a vein-like pattern to escape to the outside of the allotted area, and the grout solidified in a vein-like pattern. Accordingly, no substantial effect to compact the subject ground was obtainable.

In each injection in Group E, the grout is a usual blended fluid, and injection pressure showed no increase and remained at initial pressure during the injection, and the grout escaped to the outside the subject area of the injection. Accordingly, no substantial improvement effect was provided.

In each injection in Group F, it was found that since the grout already had extremely low flowability at the time of the injection into the ground, immediately after the grout was discharged from a discharge port of an injection pipe into the ground, dewatering of the grout occurred outside the discharge port, and subsequently, phenomenon of dewatering of the grout occurred inside the discharge port, and the dewatering of the grout in the injection pipe advanced toward the top portion of the injection pipe as the pressure application was further continued, and finally, the grout in the entire injection pipe solidified to result in such a state that no further injection was allowed.

The injection of the plastic grout having poor flowability into the ground in this manner resulted in such a phenomenon that no further injection was allowed even if pumping pressure was increased to any extent, and even fracture injection in a crack-like pattern did not occur. Such a phenomenon occurs also in a case where a powder-rich injection fluid and a plasticizer is mixed to form a plastic gel having slump of less than 5 prior to injection into an injection pipe, and the plastic gel is injected.

In each case of Groups A, B and C, when a volume of the solidified mass and injection amount were measured in an excavation investigation after the injection, dewatering ratio of the grout was found to be approximately 30% or lower. It was thereby found that when the blended fluid was injected into the ground having such a texture that the blended fluid turned into plastic gel at a dewatering ratio of 30%, a mass of gel wad formed easily. In other words, it was found that when the grout having the above-mentioned flowing range was injected into the ground and subjected to pressure-application and dewatering until no further injection was allowed, a mass of non-flowable gel was formed. Inclusive of these phenomena, it was found from various field injection experiments that if the formulation of the blended fluid was so prescribed that the blended fluid had turned into a plastic gel at the time of injection of the grout, or the blended fluid did not yet turn into a plastic gel at the time of initiation of the injection but turned into a plastic gel in the course of the injection before entrance into the ground, or a plastic gel was formed at a blended fluid dewatering ratio of 30% or lower in the course of the injection, a mass of gel was formed in the ground.

Table 18 shows examples of improvement effect in the ground having an N-value of 10 or less. Specifically, for example, in the case of Formulation Example 3, after blending, the blended fluid was mixed for 5 minutes and injected at a discharge rate of 5 liter/mm under initial pressure of 1.0 $MN/m^2$, and the discharge ratio became zero under final pressure of 3.0 $MN/m^2$, and no further injection was allowed. As a result of an excavation investigation, it was found that with the total injection volume of 150 liter, approximately 100 liter (dewatering ratio: 30%) of a mass of gel was formed Since the plastic gel injection method is injection of a plastic gel of which flowability lowers in a ground, the subject is a soft or loose ground into which such a plastic gel can be injected under a pump pressure. The subject ground is generally a soft, loose or weak ground having an N-value of 15 or less, most preferably a soft, loose or weak ground having an N-value of 10 or less. However, for the purpose of prevention of liquefaction or reinforcement of foundation, the injection method may be applied to further improvement of a ground having an N-value of 15 or more, or further 20 or more. Based on several field injection experiments, the present inventor has found that for such ground condition and purpose, the methods in Groups B and C in Experiment 2 were extremely effective.

In such a ground, when the grout of Formulation 3 in Group A was injected, injection pressure was increased after initiation of the injection, and it was thus difficult to obtain a large mass of gel. In contrast thereto, when the grout of Formulation 2 was mixed for 3 hours and then injected at a discharge ratio of 5 liter/min under initial pressure of 0.1 $MN/m^2$, the injection pressure became 1.0 $MN/m^2$ after 5 minutes, and further the total injection volume of 50 liter was injected under final pressure of 3.0 $MN/m^2$. A portion of a fissure was observed ahead a solidified mass having a large thickness, which was formed in the fissure.

In other wards, when a grout in a plastic gel state at the time of injection is pressure-injected in a ground having an N-value of 15 or less, a mass of plastic gel grows and expands in the ground. However, if the ground has an N-value of 15 or more, it is difficult to continue the injection of the grout in a plastic gel state at the time of injection. However, by injecting a blended fluid which is not yet in a plastic gel state at the initial stage of injection into a ground, the blended fluid is split and dewatered while forming fissures in a vein-like pattern to turn into a plastic gel even if the ground has an N-value as large as more than 15. This results in lowering of flowability of the grout, and the gel settles in the fissures, and around the gel as a core, a mass of gel expands and grows to a large mass of gel. In this case, the mass of gel is not spherical, but it is capable of increasing density of the surrounding ground in an assigned area and thereby enables strengthening of the ground to be realized.

From these results, injection of a blended fluid having high flowability at the initial stage of injection for effecting fracture grouting, followed by changing to injection of a plastic gel was found to be extremely effective means for improvement of a ground which has too high s ground density to inject a plastic gel or which requires preliminary ground improvement. Likewise, a blended fluid having high flowability and a plastic gel may be injected alternately to expand a mass of gel in a predetermined area while repeating application of pressure to the mass of gel resulting from the fracture injection, thereby effecting strengthening a ground having such a density that injection of a plastic gel is difficult.

As described above, it was found that if only a conventional cement grout or LW grout is used, the grout only escapes in a vein-like pattern, but by injecting a grout which turns into a plastic gel in mid-course or a grout in a plastic gel state, the applicable scope of a plastic gel injection method is remarkably expanded.

As a specific method, a grout having high flowability and a grout having low flowability may be injected in combination by selecting a kind or amount of a flowability adjusting material and mixing in a plastic gel comprising F ingredient or F and C ingredients as active ingredients or a plastic gel in which a flowability adjusting material is further mixed while injecting the grout; or a method in which a flowability adjusting material is allowed to interflow with a grout having high flowability or a plastic gel to which a flowability adjusting material is added while injecting the grout may be used jointly to combine fracture injection and mass expanding injection.

TABLE 18

| Group | mixing of blended fluid, and formation and injection of plastic gel | Formulation Example of grout (from Example 1) | state of solidification |
|---|---|---|---|
| A | blended fluid turned into plastic gel in mixing step, and the grout as such was injected | 3, 8, 12, 14, 16, 18, 18, 20 21, 25 | I |
| B | injection was initiated when blended fluid did not yet turn into plastic gel in mixing step, and the the blended fluid turned into plastic gel in the course of the injection, the grout as such was injected | 7, 9, 10, 11 15, 19 | II |
| C | blended fluid did not turn into plastic gel in mixing step, and the grout as such was injected, and pressure increased during the injection, and no further injection was allowed at the maximum pressure (3 MN/m$^2$) and the injection was terminated | 1, 2, 4, 5, 6, 13, 24 | III |
| D | blended fluid which did not present plastic state in mixing step or during the injection was injected, and pressure increased during the injection but decreased afterward | Fluid A in Table 19 Fluid A in Table 20 | IV |
| E | pressure did not increase during injection | Fluid B in Table 19 Fluid B in Table 20 Fluid A in Table 21 Fluid A in Table 22 | V |
| F | pressure increased immediately after injection | Table 21 Table 22 | VI |

Description of state of solidification in the above Table
Shape of solidified mass examined in excavation investigation
I A roughly spherical large solidified mass having a diameter of 30 to 70 cm was formed.
II A solidified mass having a hardly definable shape but not a spherical shape and a diameter of 20 to 50 cm was formed.
III Although some distal end portions were observed to spread in a vein-like pattern to the outside of the area to be injected, a solidified mass having a diameter of 20 to 50 cm was formed within the assigned area.
IV The grout escaped to the outside of the area to be injected in a vein-like pattern with each vein having a thickness of 1 to 10 cm.
V The grout escaped to the outside of the area to be injected in a vein-like pattern with each vein having a thickness of 1 to 15 cm.
VI Only a solidified mass having substantially the same size as an injection hole was formed.

TABLE 19

| Fluid A (100 liter) | | Fluid B (100 liter) | | |
|---|---|---|---|---|
| water glass | water | slag | slaked lime | water |
| 30 lit. | 70 lit. | 40 kg | 15 kg | 80 lit. |

TABLE 20

| Fluid A (100 liter) | | Fluid B (100 liter) | |
|---|---|---|---|
| water glass | water | cement | water |
| 50 lit. | 50 lit. | 15 kg | 95 lit. |

TABLE 21

| Fluid A (200 liter) | | | Fluid B |
|---|---|---|---|
| cement | aggregate (silica sand) | water | water glass |
| 80.4 kg | 260 kg | 72.6 lit. | 10 lit. |

TABLE 22

| Fluid A (200 liter) | | | Fluid B |
|---|---|---|---|
| cement | aggregate (silica sand) | water | aluminum sulfate |
| 80.4 kg | 260 kg | 72.6 lit. | 16 lit. |

As a result of the studies based on the experimental working according to the present invention as shown in FIG. 1, it was found that by virtue of the injection design as described below, ground strengthening effect can be obtained.

In FIG. 1, each space between injection points is 0.5 to 3.0 m. Improvement ratio is set to be 5 to 40%. In this connection, the improvement ratio corresponds to a sectional area of a solidified mass per 1 $m^2$ of an area to be improved which is assigned to one injection hole. Accordingly, the improvement ratio of 5 to 40% means the sectional area of 0.05 to 0.4 $m^2$. The improvement ratio is calculated also in such a manner that void decrement in the area assigned to one injection hole is calculated from an N-value of the subject ground of the improvement and a targeted N-value of the improvement, and the improvement ratio is calculated using the decrement because the decrement corresponds to the area of replacement of the void by the gelled mass. In the following, effective design examples of ground improvement according to the present invention are shown in Table 23. These are based on experimental examples carried out in a sandy ground in Example 2. Injection arrangement is a square arrangement as shown in FIG. 1(B), and the spaces between injection points are 1 m and 2 m, and the improvement ratios are 5%, 10%, 15% and 20%.

TABLE 23

| space between injection points (m) | area assigned to one hole for imp. ($m^2$) | imp. ratio (%) | diameter of solidified mass (m) | sectional area of solidified mass ($m^2$) | coef. of shrinkage due to dewatering *2 | injection volume per m *3 ($m^3/m$) |
|---|---|---|---|---|---|---|
| 1.0 | 1.0 | 5.0 | 0.252 | 0.05 | 0.69 | 0.07 |
| 2.0 | 4.0 | 5.0 | 0.504 | 0.20 | 0.69 | 0.29 |
| 1.0 | 1.0 | 10.0 | 0.357 | 0.10 | 0.69 | 0.15 |
| 2.0 | 4.0 | 10.0 | 0.714 | 0.40 | 0.69 | 0.58 |
| 1.0 | 1.0 | 15.0 | 0.437 | 0.15 | 0.69 | 0.22 |
| 2.0 | 4.0 | 15.0 | 0.874 | 0.60 | 0.69 | 0.87 |
| 1.0 | 1.0 | 20.0 | 0.505 | 0.20 | 0.69 | 0.29 |
| 2.0 | 4.0 | 20.0 | 1.010 | 0.80 | 0.69 | 1.16 |

*2: The coefficient of shrinkage due to dewatering is an average value of shrinkage ratios which is calculated from volumes of solidified masses for improvement and injection volumes which are derived from Test Injections.
*3: The injection volume per m is an injection volume per m of injection depth of the solidified mass.

It is necessary to determine injection rate per minute (liter/min) and injection pressure so that the injection volume calculated as described above results in the predetermined depth. It was found that for this purpose, the injection is preferably carried out while controlling the injection at a discharge ratio per minute of 5 to 50 liter/min under injection pressure of 0.5 to 10 MP.

In this connection, it was found that if ground uplift is controlled to be 20 cm or less, preferably 10 cm or less, the ground uplift becomes about 5 to 10 cm by dewatering of the gel in the ground several days later.

It was further found that if the injection depth is 3.0 m or less from the ground level (GL), the ground was somewhat susceptible to uplift, and if the injection depth is 1.5 m or less from GL, the ground is very likely to undergo uplift of 10 cm or more. Accordingly, it was found to be effective that measures to render the ground less susceptible to uplift when the injection depth is 3.0 m or less, or 1.5 m or less. It was further found that the ground improvement effect can be obtained only when the grout is injected from the plurality of bores with the above-described spaces therebetween, and the resulting masses cooperatively interact to compact the ground therebetween.

INDUSTRIAL APPLICABILITY

A plastic gel grouting material, which comprises a silica type non-hardening powdery material and water or a silica type non-hardening powdery material, a calcium type hardening developing material and water as active ingredients, is statically pressure-injected into a soft, loose or weak ground to thereby form masses derived from the grouting material per se in the ground, and concurrently therewith, to compact the surrounding earth and sand, thereby increasing density of the ground. Accordingly this technique is highly applicable in the field of civil engineering technology.

Explanation of Indicating Number in FIG. 7

| | |
|---|---|
| 1: | start |
| 2: | Set system specification is registered. |
| 3: | Specification switch is turned ON. |
| 4: | read the specification |
| 5: | initiation of operation |
| 6: | Switch is turned on to start recording. |
| 7: | Data recording by recorder is started. |
| 8: | preparation of blending |
| 9: | initiation of blending |
| 10: | Start switch is turned ON. |
| 11: | actuation of mixer |
| 12: | Should water be added? |
| 13: | batching and supply of water |
| 14: | Should powdery matter be added? |
| 15: | batching and supply of powdery matter |
| 16: | Should plasticizer be added? |
| 17: | batching and supply of plasticizer |
| 18: | measurement of flowability |
| 19: | Is flowability within predetermined range? |
| 20: | completion of blending |
| 21: | preparation of injection |
| 22: | initiation of injection |
| 23: | Start switch is turned ON |
| 24: | Open signal for automatically-operated valve is outputted. |
| 25: | actuation of pump |
| 26: | monitoring of pressure and flow |
| 27: | Is pressure within the range |
| 28: | Is flow rate within the range? |
| 29: | Is ground displacement within a predetermined allowable range? |
| 30: | adjustment · control |
| 31: | to be finished? |
| 32: | suspension |
| 33: | change of setting |
| 34: | discontinuation of suspension |
| 35: | to finish |
| 36: | Close signal for automatically-operated valve is outputted. |
| 37: | Does next injection follow? |
| 38: | entirely finished? |
| 39: | completion of injection |
| 40: | Recording switch is turned OFF. |

Explanation of Indicating Number in FIG. 7

| | |
|---|---|
| 41: | completion of data recording |
| 42: | end |

The invention claimed is:

1. A method for strengthening a ground comprising:
providing a plurality of injection holes in the ground, and pressure-injecting a plastic gel grouting material into the ground through the injection holes to push soil particles of the ground outward while forming non-fluid masses in the ground,
said plastic gel grouting material comprising (a) and (b) as follows:
(a) ingredients (1), (2), and (3) as active ingredients:
(1) non-hardening powdery material containing silica selected from the group consisting of fly ash, slag, incinerated ash, clay, earth and sand, and silica sand,
(2) powdery hardening developing material containing calcium selected from the group consisting of cement, lime, gypsum and slag, provided that if the non-hardening powdery material is slag, slag is excluded from the hardening developing material,
(3) water, and
(b) a flowability adjusting material selected from the group consisting of a gelation accelerator, gelation retardant, viscosity improver, water retention agent, deflocculant, foaming agent, and fluidizer, and repeating the pressure injection of the plastic grouting material in an interval mode;
wherein the plastic gel grouting material:
(A) has a table flow of 12 cm or more at the time of the pressure-injection and/or slump of more than 5 cm at the time of the pressure injection and/or cylinder flow of more than 8 cm,
(B) turns into plastic gel when dewatering ratio is 30% or lower; and
(C) increases density of the ground surrounding the plurality of injection holes while forming the plurality of masses in the ground to effect strengthening the ground.

* * * * *